(12) United States Patent
Noth

(10) Patent No.: US 10,478,010 B2
(45) Date of Patent: Nov. 19, 2019

(54) CODE ARRANGEMENT AND CONTAINER OF SYSTEM FOR PREPARING A BEVERAGE OR FOODSTUFF

(71) Applicant: Nestec S. A., Vevey (CH)

(72) Inventor: André Noth, Pully (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 15/564,828

(22) PCT Filed: Feb. 23, 2016

(86) PCT No.: PCT/EP2016/053732
§ 371 (c)(1),
(2) Date: Oct. 6, 2017

(87) PCT Pub. No.: WO2016/173737
PCT Pub. Date: Nov. 3, 2016

(65) Prior Publication Data
US 2018/0110362 A1    Apr. 26, 2018

(30) Foreign Application Priority Data

Apr. 30, 2015 (EP) .................................... 15165920

(51) Int. Cl.
*G06K 19/06* (2006.01)
*A47J 31/44* (2006.01)
*B65D 85/804* (2006.01)

(52) U.S. Cl.
CPC ...... *A47J 31/4492* (2013.01); *B65D 85/8043* (2013.01)

(58) Field of Classification Search
CPC .................. A47J 31/4492; B65D 85/8043
(Continued)

(56) References Cited

U.S. PATENT DOCUMENTS 8,194,914 B1    6/2012  Skogg et al.
9,033,213 B2 *  5/2015  Pearson ................. G06Q 10/08
                                              235/375
(Continued)

FOREIGN PATENT DOCUMENTS

CL    2012001987 A1   12/2012
CL    2013001292 A1    9/2013
(Continued)

OTHER PUBLICATIONS

CL Application No. PCT 2017-002704; Nestec S. A., Oct. 25, 2017; Office Action dated Apr. 8, 2019.
(Continued)

*Primary Examiner* — Karl D Frech
(74) *Attorney, Agent, or Firm* — K&L Gates LLP

(57) ABSTRACT

A container for a beverage or foodstuff preparation machine, the container for containing beverage or foodstuff preparation material and comprising on a surface thereof an arrangement of separate codes encoding preparation information, whereby each code encodes a distinct phase of a preparation process. Also disclosed is a beverage or foodstuff preparation system comprising the container and an attachment configured for attachment to an element of the system. Further disclosed is a computer program and non-transitory computer readable medium for use therewith. Also disclosed are methods of producing and using the above devices and apparatus.

13 Claims, 14 Drawing Sheets

(58) Field of Classification Search
USPC .......................................... 235/494, 383, 385
See application file for complete search history.

(56) References Cited

U.S. PATENT DOCUMENTS

| | | | |
|---|---|---|---|
| 2002/0048621 A1* | 4/2002 | Boyd ................. | A47J 31/3623 426/77 |
| 2010/0078480 A1 | 4/2010 | Aker | |
| 2011/0240211 A1 | 10/2011 | Iwase | |
| 2012/0055342 A1 | 3/2012 | Traitler et al. | |
| 2012/0063753 A1* | 3/2012 | Cochran ................. | A47J 36/02 392/416 |
| 2013/0153670 A1* | 6/2013 | Robinson ......... | G06K 19/06037 235/494 |
| 2013/0202754 A1* | 8/2013 | Cochran ................. | A47J 36/02 426/383 |
| 2013/0230627 A1 | 9/2013 | Hansen et al. | |
| 2014/0242239 A1 | 8/2014 | Boggavarapu | |
| 2014/0252093 A1 | 9/2014 | Jarisch et al. | |
| 2015/0017293 A1 | 1/2015 | Carr et al. | |
| 2015/0186966 A1* | 7/2015 | Holman ................. | B65D 85/70 705/15 |
| 2016/0251101 A1* | 9/2016 | Kong ..................... | B65B 57/10 53/445 |
| 2017/0150843 A1* | 6/2017 | Rosalia ................. | A47J 43/044 |

FOREIGN PATENT DOCUMENTS

| | | |
|---|---|---|
| EP | 2481330 A1 | 8/2012 |
| GB | 2499201 A | 8/2013 |
| WO | 2014206799 A1 | 12/2014 |
| WO | 2016173735 A1 | 11/2016 |
| WO | 2016173736 A1 | 11/2016 |

OTHER PUBLICATIONS

International Search Report, dated Apr. 21, 2016, in PCT/EP2016/053732, filed Feb. 23, 2016.
Written Opinion of the International Searching Authority, dated Apr. 21, 2016, in PCT/EP2016/053732, filed Feb. 23, 2016.
International Search Report, dated Apr. 20, 2016, in PCT/EP2016/053729, filed Feb. 23, 2016.
Written Opinion of the International Searching Authority, dated Apr. 20, 2016, in PCT/EP2016/053729, filed Feb. 23, 2016.
International Search Report, dated Apr. 20, 2016, in PCT/EP2016/053731, filed Feb. 23, 2016.
Written Opinion of the International Searching Authority, dated Apr. 20, 2016, in PCT/EP2016/053731, filed Feb. 23, 2016.
EP18177642; Nestec, S. A.; European Search Report dated Aug. 8, 2018; filed Jun. 14, 2018.

\* cited by examiner

CODE ARRANGEMENT AND CONTAINER OF SYSTEM FOR PREPARING A BEVERAGE OR FOODSTUFF

CROSS-REFERENCE TO RELATED APPLICATIONS/INCORPORATION BY REFERENCE STATEMENT

This application is a US national stage application filed under 35 USC § 371 of International Application No. PCT/EP2016/053732, filed Feb. 23, 2016; which claims priority to EP App No. 15165920.8, filed Apr. 30, 2015. The entire contents of the above-referenced patent applications are hereby expressly incorporated herein by reference.

TECHNICAL FIELD

The described embodiments relate generally to beverage or foodstuff preparation systems which prepare a beverage or foodstuff from containers such as coffee capsules, and in particular to codes arranged on the container that encode preparation information for reading by a machine of said system.

BACKGROUND

Increasingly preparation machines for the preparation of a beverage or foodstuff are configured to operate using a container that comprises a single-serving of a preparation material, e.g. coffee, tea, ice cream, yoghurt. The machine may be configured for preparation by processing said material in the container, e.g. with the addition of fluid, such as milk or water, and the application of mixing thereto, such a machine is disclosed in PCT/EP13/072692. Alternatively, the machine may be configured for preparation by at least partially extracting an ingredient of the material from the container, e.g. by dissolution or brewing. Examples of such machines are provided in EP 2393404 A1, EP 2470053 A1, EP 2533672 A1, EP 2509473 A1, EP 2685874 A1.

The increased popularity of these machines may be partly attributed to enhanced user convenience compared to a conventional preparation machine, e.g. compared to a manually operated stove-top espresso maker or cafetiére (French press).

It may also be partly attributed to an enhanced preparation process, wherein preparation information specific to the container and/or preparation material therein is: encoded in a code on the container; read by the preparation machine; used by the machine to optimise the preparation process. In particular, the preparation information may comprise operational parameters of the machine, such as: fluid temperature; preparation duration; mixing conditions.

Accordingly, there is a need to code preparation information on the container. In particular there is a need to encode large amounts of information as preparation processes increase in complexity due to the development of more sophisticated machines, which are able to prepare a wide-range of foodstuff or beverages. Various such codes have been developed, an example is provided in EP 2594171 A1, wherein a periphery of a flange of a capsule comprises a code arranged thereon. The code comprises a sequence of symbols that can be printed on the capsule during manufacture. A drawback of such a code is that its encoding density is limited, i.e. the amount of preparation information that it can encode is limited. A further drawback is that the code is highly visible and may be considered aesthetically displeasing. EP14168061 discloses a similar code with similar such drawbacks. EP2525691B discloses a container with a 2D barcode, which has a higher albeit limited encoding density.

DETAILED DESCRIPTION

Figure 1:
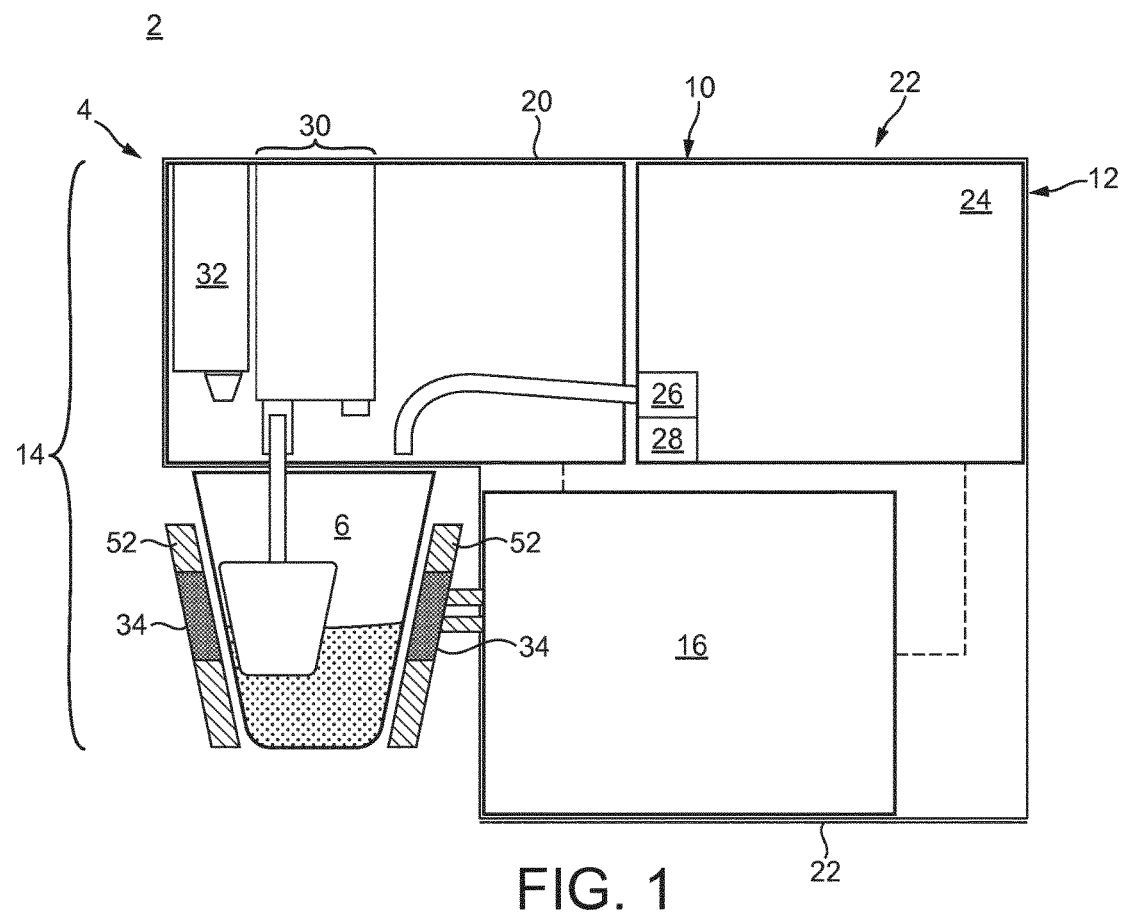
FIG. 1 is a diagrammatic drawing illustrating embodiments of beverage or foodstuff preparation systems that comprises a machine and a container according to embodiments of the present disclosure.

Certain non-limiting aspects of the disclosure are directed to providing a container for beverage or foodstuff preparation material that comprises an encoding arrangement that can encode a range of complex preparation operations. It would be advantageous to provide such an encoding arrangement that has a high encoding density. It would be advantageous to provide such an encoding arrangement that is less visible than the prior art. It would be advantageous to provide such an encoding arrangement that is un-complicated such that it does not comprise a large number of symbols. It would be advantageous to provide such an encoding arrangement that is cost-effective to produce and that can be read by a cost-effective code reader. It would be advantageous to provide such an encoding arrangement that can be reliably read and processed.

Disclosed herein according to a first embodiment is a container for use (e.g. it is suitably dimensioned) by a beverage or foodstuff preparation machine, in particular the machine according to the second embodiment. The container for containing beverage or foodstuff material (e.g. it has an internal volume and may be food safe). The container may be a single-serving container, e.g. it is dimensioned for containing a dosage of beverage or foodstuff material for preparation of a single serving (e.g. pre portioned) of said product. The container may be a single-use container, i.e. it is intended to be used in a single preparation process after which it is preferably (but not by way of limitation) rendered unusable, e.g. by perforation, penetration, removal of a lid or exhaustion of said material. The container comprises on a surface thereof an arrangement of separate codes (e.g. the codes are distinct from each other such that they: are geometrically separate; do not share common portions; encode information as isolated units) encoding preparation information, whereby each code encodes a distinct phase (i.e. each code encodes a single phase only) of the preparation information corresponding to a distinct phase of a preparation process. In certain non-limiting embodiments, there are 3-8 difference phases of a preparation process encoded.

Accordingly, certain non-limiting aspects of the disclosure are solved since the container can encode a preparation operation as a series of distinct phases, with a separate code for each phase.

The preparation information may comprise information that is related to a phase preparation process, e.g. one or more parameters used by the machine such as: temperature; torque and angular velocity (for mixing units of machines which effect mixing); flow rate/volume; pressure; % cooling power; time (e.g. for which a phase comprising one or more of the aforesaid parameters are applied for); expiry date; container geometric properties; phase identifier; container identifier; a recipe identifier that may be used to retrieve one or more parameters of the machine which are used by the machine to prepare the product, wherein said parameters may be stored on the machine; pre-wetting volume.

In certain non-limiting embodiments, the codes have a peripheral shape that is repeatable with an at least partially tessellating arrangement, such as a rectangular shape (e.g. a square or other rectangle) or other polygon such as a hexagon. One advantage is that the codes can be compactly arranged together in a group. The codes may be arranged adjacent to each other along at least one edge thereof (i.e. they extend along a line which is at least one code wide). The codes may all have the same orientation. Alternatively, the adjacent codes may be rotated, e.g. by one of 90°, 180°, 270°. One advantage is that by having a more variable arrangement the coding on a container is less visible.

The codes may be arranged in a column along a line (i.e. in a 1×i arrangement wherein i extends along a line). The line may be linear or non-linear, such as circumferentially extending. In certain non-limiting embodiments, there are a plurality of columns arranged adjacent each other and extending longitudinally along parallel track arrangements. The columns may be aligned with each other such that rows, which extend perpendicular to the columns, are aligned. With such an arrangement a vertex of a code is common to four codes. Alternatively adjacent columns may be offset with respect to each other along said lines such that the rows are not aligned. With such an arrangement a vertex of a code is common to two codes only. One advantage is that by having a more variable arrangement coding is less visible.

The codes may be arranged in a particular sequence that is ordered according to an order of use of the phases encoded therein during a preparation process (e.g. the phases are arranged in numerical order from 1-i, whereby phase 1 is used first, followed by 2 and so up to i). The codes may be arranged in said order along the aforesaid columns. One advantage is that the location of the codes can be processed to determine conveniently the order of the phases encoded therein.

More particularly, the codes may be arranged into a plurality of coding regions, such as (but not limited to) 2-6 regions. Each coding region may comprise a plurality of codes with each code encoding the same phase (i.e. identical codes), whereby the coding regions have said sequential arrangement (i.e. the regions are arranged in an order according to use during the preparation process). Alternatively, each coding region may comprise a plurality of codes with the codes encoding the different phases, whereby said plurality of codes in each coding region has the said sequential arrangement (i.e. the codes within the coding regions are arranged in an order according to use during the preparation process). An end of the said sequential arrangements may comprise codes that encode information to identify a start and end of said sequence. The coding regions may be annular or at least partially annular (i.e. in the circumferential direction) in shape with a concentric arrangement. One advantage is that, when reading the code the image processor can move outwardly from the centre in any direction to ensure all of the codes are read. Alternatively the coding regions may by the shape of a right-angled parallelogram and are stacked adjacent each other.

One or more of the codes (such as, but not limited to, all) may encode as the preparation information a phase identifier to identify an order of the phase used during said preparation process.

The codes may comprise a reference portion and a data portion. The reference portion providing a reference position for the data portion. The reference portion comprising a arrangement, which may be linear, of at least two reference units defining a reference line r, the data portion comprising at least one data unit, wherein the data unit is arranged on (e.g. with at least a portion thereof, generally a centre, intersecting said line) a portion of an encoding line D that intersects the reference line r, the data unit occupies a distance d along the encoding line D as a variable to at least partially encode a parameter of the preparation information. The distance d may be discrete (i.e. the data unit can only occupy one of a plurality of predetermined positions along the line D) or continuous (i.e. a data unit can occupy any position along the line D). The latter is preferable (but not by way of limitation) since more information can be encoded. The data portion may comprise a plurality of encoding lines D (e.g. up to 2, 3, 4, 5, 6, 10, 16, 20 or more), each comprising a corresponding arrangement of a data unit (i.e. the data unit is arranged a distance d from an intersection point to at least partially encode a parameter). The encoding line D may have one of the following arrangements: encoding line D is semi (i.e. it comprises a segment of a circle) or fully circular and is arranged with a tangent thereto orthogonal to the reference line r at said intersection point; the encoding line D is linear and arranged orthogonal to the reference line r. In certain non-limiting embodiments, the codes have a peripheral length (e.g. a diameter or side length of a rectangle) of 600-1600 μm or 600-6000 μm. Accordingly certain non-limiting aspects of the disclosure are achieved since the code is not particularly visible. More particularly, the units (i.e. the data units and reference units) that comprise the code have, in certain non-limiting embodiments, a unit length of 50-250 μm. The aforesaid unit length may be defined as: a diameter for a substantially circular unit; a side length for a quadrilateral unit; other suitable measure of length for a unit of another shape. The code may comprise and encoding area which is annular, whereby the encoding lines D extend concentrically about a centre thereof. Alternatively the code may comprise and encoding area which is rectangular. The data units of the code are arranged within the bounds of said encoding area.

As an alternative to the above code other suitable codes may be used, such as a QR code or other optically readable code.

The data units and reference units may be formed by one of the following: printing (e.g. by a conventional ink printer: one advantage is that the code can be conveniently and cost-effectively formed); engraving; embossing. The code may be formed directly on a surface of the container, e.g. the substrate for the units is integral with the container. Alternatively the code may be formed on an attachment, which is attached to the container.

The container may comprise the beverage or foodstuff preparation material contained therein. The container may comprise one of the following: a capsule; packet; a receptacle for consumption of the beverage or foodstuff therefrom. The capsule may have an internal volume of 5-80 ml. The receptacle may have an internal volume of 150-350 ml. The packet may have an internal volume of 150-350 ml or 200-300 ml or 50-150 depending on the application. In certain non-limiting embodiments, the packet comprises the arrangement of codes extending along a peripheral rim thereof. The packet may comprise a plurality of internal volumes, whereby each internal volume may have associated therewith a said arrangement of codes, whereby each code arrangement may encode preparation information specific to said internal volume. Each arrangement may extend along a periphery of the said volume.

Disclosed herein according to a second embodiment is a beverage or foodstuff preparation system comprising a container according to any feature of the first embodiment and a beverage or foodstuff preparation machine, said preparation machine comprising: a preparation unit to receive a container and to prepare a beverage or foodstuff therefrom; a code processing system operable to: obtain one or more digital image(s) (e.g. several digital images can be mosaicked to ensure all the encoded phases are captured) of a plurality of codes of the container; process said digital image(s) to decode for each phase of a beverage preparation process the encoded preparation information and to determine an order of said phases; a control system operable to control the preparation unit to execute the preparation process using said decoded preparation information in the determined order of phases.

Determining of an order of the phases may comprise decoding an encoded phase identifier of a phase or processing the arrangement of the codes on the container, e.g. for cores arranged sequentially.

Processing of the digital image to decode the preparation information may comprise: locating the units of the code; identifying the reference units and determining therefrom a reference line r, determining for each data unit a distance d along the encoding line D from the reference line r.

The preparation unit is generally operable perform said preparation by the addition of fluid, such as water or milk to the beverage or foodstuff material. The container processing subsystem may comprise one of an: an extraction unit; a dissolution unit; a mixing unit. The container processing subsystem may further comprise a fluid supply that is operable to supply fluid to the aforesaid unit. Generally the fluid supply comprises a fluid pump and a fluid heater. The aforesaid units may be configured for operation with a container containing beverage or foodstuff material.

Disclosed herein according to a third embodiment is a method of preparing a beverage or foodstuff, using the system according to the second embodiment, the method comprising: obtaining one or more digital image(s) of a plurality of codes of the container according to the first embodiment; obtaining one or more digital images of a plurality of codes of the container; processing said digital image(s) to decode for each phase of a beverage preparation process the encoded preparation information and to determine an order of said phases; a control system operable to control the preparation unit to execute the preparation process using said decoded preparation information in the determined order of phases.

The method may further comprise any of the steps for processing of the digital image as defined by the third embodiment.

Disclosed herein according to a fourth embodiment is an attachment configured for attachment to a container of a beverage or foodstuff preparation machine according to the first embodiment. The attachment may comprise: a carrier carrying on a surface thereof an arrangement of codes as described in the first embodiment; an attachment member for attachment to said container. In certain non-limiting embodiments, the attachment member is configured for attaching said carrier to the container as if it were formed integrally on the container. In this way it can be read by the image capturing device as if it formed integrally thereto. Examples of suitable attachment members comprise: an adhesive strip; a mechanical fastener such as a clip or bolt.

Disclosed herein according to a fifth embodiment is attachment configured for attachment to a beverage or foodstuff preparation machine according to the second embodiment. The attachment may comprise: a carrier carrying on a surface thereof an arrangement of codes as described in the first embodiment; an attachment member for attachment to said machine. In certain non-limiting embodiments, the attachment member is configured for attaching said carrier to the machine at a position between an image capturing device of said machine and the container when received, such that the code thereon is proximate said container. In this way it can be read by the image capturing device as if it were attached to the container. Examples of suitable attachment members comprise: extensions attached to said carrier comprising an adhesive strip or a mechanical fastener such as a clip, bolt or bracket.

Disclosed herein according to a sixth embodiment is a use of a container as defined in the first embodiment or the attachments as defined in the fourth and fifth embodiment for a beverage or foodstuff preparation machine as defined in the second embodiment.

Disclosed herein according to a seventh embodiment is a computer program for a processor of a code processing system of a beverage or foodstuff preparation machine as defined the second embodiment, the computer program comprising program code to: obtain one or more digital images of a plurality of codes of the container according to the first embodiment; process said digital image(s) to decode for each phase of a beverage preparation process the encoded preparation information and to determine an order of said phases. The computer program may further comprise program code for effecting any of the steps of processing of the digital image as defined by the second embodiment. The functional units described by the computer programs generally herein may be implemented, in various manners, using digital electronic logic, for example, one or more ASICs or FPGAs; one or more units of firmware configured with stored code; one or more computer programs or other software elements such as modules or algorithms; or any combination thereof. One embodiment may comprise a special-purpose computer specially configured to perform the functions described herein and in which all of the functional units comprise digital electronic logic, one or more units of firmware configured with stored code, or one or more computer programs or other software elements stored in storage media.

Disclosed herein according to an eighth embodiment is a non-transitory computer readable medium comprising the computer program according to seventh embodiment. The non-transitory computer readable medium may comprise a memory unit of the processor or other computer-readable storage media for having computer readable program code stored thereon for programming a computer, e.g. a hard disk, a CD-ROM, an optical storage device, a magnetic storage device, Flash memory.

Disclosed herein according to an eighth embodiment is a method of encoding preparation information, the method comprising forming a plurality of separate codes on: a container for a beverage or foodstuff preparation machine, the container for containing beverage or foodstuff material; or an attachment for attachment to said container or a beverage of foodstuff preparation machine, the method further comprising: whereby each code encodes a distinct phase of a preparation process.

Disclosed herein according to a ninth embodiment is provided a use of a code as defined in the first embodiment for encoding preparation information, such as (but not limited to) on: a container of a beverage or foodstuff preparation machine, the container for containing beverage or foodstuff material as defined in the first embodiment; or an attachment according to the seventh or eighth embodiment.

Disclosed herein according to a tenth embodiment is an information carrying medium comprising the code according to the first embodiment. In particular the information carrying medium may comprise the container as defined herein, either of the attachments as defined herein, or a substrate, such as an adhesive strip of other suitable medium. The method of encoding preparation information according to the second embodiment may be applied to the information carrying medium. The method of decoding preparation information according to the third aspect may be applied to the information carrying medium. The beverage or foodstuff preparation machine according to the fourth embodiment may be configured for operation with the information carrying medium, e.g. via its attachment to the container or other suitable component, such as either of the aforedescribed attachments. The system according to fifth may comprise the information carrying medium. The method of preparing a beverage or foodstuff of the sixth embodiment may be adapted to comprise obtaining a digital image of the code of the information carrying medium.

The preceding summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Moreover, the above embodiments may be combined in any suitable combination to provide further embodiments. Other features, aspects, and advantages of the subject matter described herein will become apparent from the following Detailed Description, Figures, and Claims.

Beverage Preparation System

A beverage or foodstuff preparation system 2, an example of which is illustrated in FIG. 1, comprises: a beverage or foodstuff preparation machine 4; a container 6, which are described sequentially.

Preparation Machine

The beverage or foodstuff preparation machine 4 is operable to process a portion of beverage or foodstuff material, hereon preparation material, to a foodstuff and/or beverage for consumption by eating and/or drinking. A foodstuff material as defined herein typically comprises a substance capable of being processed to a nutriment generally for eating, which may be chilled or hot, non-exhaustive examples of which are: yoghurt; mousse; parfait; soup; ice cream; sorbet; custard; smoothies. In certain non-limiting embodiments, the foodstuff is a liquid, gel or paste foodstuff. A beverage material as defined herein may comprise a substance capable of being processed to a potable substance, which may be chilled or hot, non-exhaustive examples of which are: tea; coffee, including ground coffee; hot chocolate; milk; cordial. It will be appreciated that there is a degree of overlap between both definitions, i.e. a said machine 4 can prepare both a foodstuff and a beverage.

The preparation machine 4 is generally dimensioned for use on a work top, i.e. it is less than 70 cm in length, width and height. The preparation machine 4 may have various configurations depending on the particular type of beverage and/or foodstuff it is intended for preparation of, examples of which are:

a first embodiment, an example of which is illustrated in FIG. 1, wherein the preparation machine 4 is generally for foodstuff preparation and is operable to prepare preparation material that is supplied in a container 6 that is a receptacle for end-user consumption therefrom, example of a suitable preparation machine is provided in PCT/EP13/072692, which is incorporated herein by reference;

a second embodiment wherein the preparation machine 4 is generally for foodstuff preparation and is operable to dispense preparation material that is supplied in a container 6, such as a packet or capsule, into an alternate receptacle for end-user consumption, wherein the foodstuff is prepared in the said receptacle, an example of a suitable preparation machine is disclosed in PCT/EP13/072692, and EP 14167344A, which is incorporated herein by reference;

a third embodiment wherein the preparation machine 4 is generally for beverage preparation and is operable to extract one or more ingredients of preparation material within a single use container 6, such as a packet or capsule, and to dispense the said ingredients into an alternate receptacle for end-user consumption, examples of suitable preparation machines 4 are disclosed in EP 2393404 A1, EP 2470053 A1, EP 2533672 A1, EP 2509473 A1 EP 2685874 A1, EP 2594171 A1, which are incorporated herein by reference.

For completeness a several such preparation machine 4 will now be described in more detail, which can be considered to comprise: a housing 10; a preparation unit 14; a control system 16; code processing system 18, which are described sequentially:

Housing

The housing 10 houses and supports the aforesaid components and comprises: a base 20 for abutment of a horizontally arranged support surface; a body 22 for mounting thereto the associated components.

Preparation Unit

Depending on the embodiment of the preparation machine 4, the preparation unit 14 may be operable to at least partially prepare a foodstuff/beverage from preparation material arranged in: a single-serving, single use container 6; a container 6 that is a receptacle for end-user consumption therefrom; a combination thereof. Embodiments of each configuration of which will be discussed.

In general all the embodiments the preparation unit 14 comprises a fluid supply 12 that is operable to supply fluid used during preparation, which is in general water or milk that maybe conditioned (i.e. heated or cooled), typically to the container 6 (or receptacle depending on the embodiment of the machine 4). The fluid supply 12 typically comprises: a reservoir 24 for containing fluid, which in most applications is 1-5 litres of fluid; a fluid pump 26, such as a reciprocating or rotary pump that may be driven by an electrical motor or an induction coil; a an optional fluid heater 28, which generally comprises an in-line, thermo block type heater; an outlet for supplying the fluid to the preparation unit 14. The reservoir 24, fluid pump 26, fluid heater 28, and outlet are in fluid communication with each other in any suitable order. In an alternative example the fluid supply 12 may comprise a connection to an external fluid source e.g. a water main.

Preparation Unit for Preparation of Preparation Material Supplied in Container

According to the first embodiment of the preparation machine 4, an example of which is illustrated in FIG. 1, the preparation unit 14 is operable to prepare preparation material stored in a container 6 that is a receptacle, such as a cup, pot or other suitable receptacle configured to hold approximately 150-350 ml of prepared product. Herein the preparation unit 14 may be referred to as a mixing unit and may comprise an: agitator unit 30; auxiliary product unit 32; thermal exchanger 34; receptacle support 52, which will be described sequentially.

The agitator unit 30 is operable to agitate preparation material within the receptacle 6 for at least partial preparation thereof. The agitator unit 30 may comprise any suitable mixing arrangement, e.g. a: planetary mixer; spiral mixer; vertical cut mixer. Typically the agitator unit 30 comprises: an implement for mixing having a mixing head for contact with the preparation material; and a drive unit, such as an electric motor or solenoid, to drive the mixing implement. In a particular (but non-limiting) example of a planetary mixer the mixing head comprises an agitator that rotates with a radial angular velocity W1 on an offset shaft that rotates with gyration angular velocity W2, such an arrangement is disclosed in PCT/EP13/072692.

The auxiliary product unit 32 is operable to supply an auxiliary product, such as a topping, to the container 6. The auxiliary product unit 32 comprises: a reservoir to store said product; an electrically operated dispensing system to effect the dispensing of said product from the reservoir.

The thermal exchanger 34 is operable to transfer and/or extract thermal energy from the container 6. In an example of transfer of thermal energy it may comprise a heater such as thermo block. In an example of extraction of thermal energy it may comprise heat pump such as a refrigeration-type cycle heat pump.

The receptacle support 52 is operable to support the container 6 during a preparation process such that the container 6 remains stationary during agitation of the preparation material therein by the agitator unit 30. In certain non-limiting embodiments, the receptacle support 52 is thermally associated with the thermal exchanger 34 such that transfer of thermal energy can occur with a supported receptacle.

According to the second embodiment of the preparation machine 4, the afore-described first embodiment preparation unit 14 further comprises a dispensing mechanism for receiving a container 6 and dispensing the associated preparation material into the receptacle, where it is prepared. Such an example is disclosed in EP 14167344 A. In a particular embodiment with this configuration the container may be a partially collapsible container, whereby the container is collapsible to dispense material stored therein. Such an example is disclosed in EP 15195547 A, which is incorporated herein by reference. In particular a collapsible portion of the container comprises a geometric configuration and/or portion of weakening such that said portion collapses in preference to a retaining portion upon the application of axial load through both portions. In such an embodiment the container processing unit 14 comprises a mechanical actuation device configured to apply an axial load to collapse said container, an example of which is provided in the reference application.

Preparation Unit for Extraction of Beverage Ingredients from Container

According to the third embodiment of the preparation machine 4, the preparation unit 14 may be referred to as an extraction unit and may be operable: to receive the container 6 containing preparation material; process the container 6 to extract one or more ingredients of a beverage therefrom, and to dispense the said ingredients into an alternate receptacle for end-user consumption. The container is generally a single-use, single-serving container such as a capsule or packet: a preparation unit 14 for use with the said capsule will initially be described followed by a variant machine for use with said packet.

In the example of the container 6 comprising a capsule the preparation unit 14 is operable to move between a capsule receiving position and a capsule extraction position, when moving from the capsule extraction position to the capsule receiving position, the extraction unit may be moved through or to a capsule ejection position, wherein a spent capsule can be ejected therefrom. The preparation unit typically comprises: an injection head; a capsule holder; a capsule holder loading system; a capsule insertion channel; a capsule ejection channel, which are described sequentially.

The injection head is configured to inject fluid into a cavity of the capsule when held by the capsule holder, and to this end has mounted thereto an injector, which has a nozzle that is in fluid communication with the outlet of the fluid supply.

The capsule holder is configured to hold the capsule during extraction and to this end it is operatively linked to the injection head. The capsule holder is operable to move to implement the said capsule receiving position and capsule extraction position: with the capsule holder in the capsule receiving position: a capsule can be supplied to the capsule holder from the capsule insertion channel; with the capsule holder in the capsule extraction position a supplied capsule is held by the holder, the injection head can inject fluid into the cavity of the held capsule, and one or more ingredients can be extracted therefrom. When moving the capsule holder from the capsule extraction position to the capsule receiving position, the capsule holder can be moved through or to the said capsule ejection position, wherein a spent capsule can be ejected from the capsule holder via the capsule ejection channel.

The capsule holder loading system is operable to drive the capsule holder between the capsule receiving position and the capsule extraction position.

The preparation unit 14 can operate by means of injection of fluid at pressure into the cavity of the capsule 6, e.g. at up to 20 bar, which can be achieved by means of the injection head and pump 26. It may alternatively operate by centrifugation as disclosed in EP 2594171 A1, which is incorporated herein by reference. Further examples of suitable preparation units are provided in EP 2393404 A1, EP 2470053 A1, EP 2533672 A1, EP 2509473 A1 EP 2685874 A1 and EP 2594171 A1. The preparation unit 14 may alternatively comprise a dissolution unit configured as disclosed in EP 1472156 and in EP 1784344, which are incorporated herein by reference.

In the example of the container 6 comprising a packet the preparation unit 14 is operable to receive the packet and to inject, at an inlet thereof, fluid from the fluid supply 12. The injected fluid mixes with preparation material within the packet to at least partially prepare the beverage, which exits the packet via an outlet thereof. The preparation unit 14 comprises: a support mechanism to receive an unused packet and eject a spent packet; an injector configured to supply fluid to the packet from the outlet of the fluid supply. Further detail is provided in WO 2014/125123, which is incorporated herein by reference.

Control System

Figure 2:
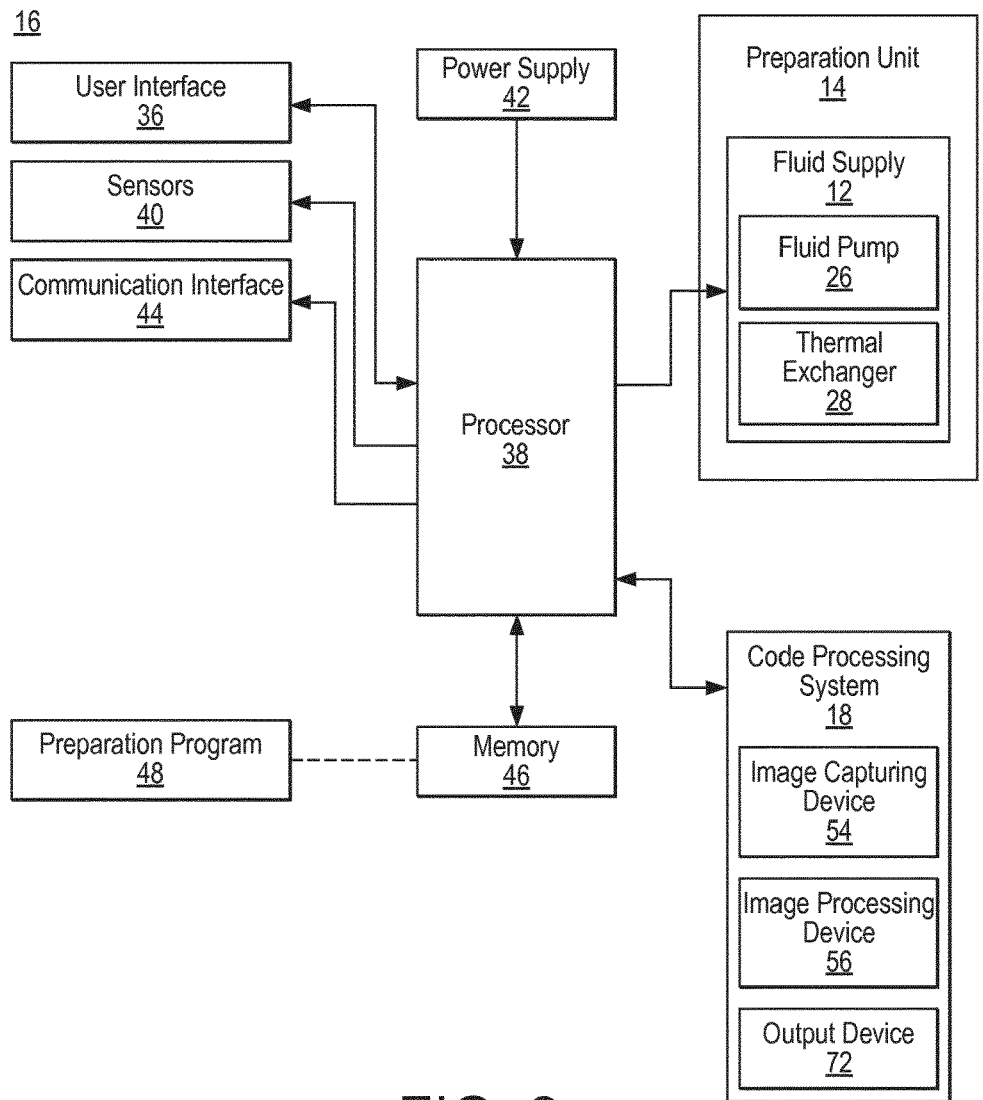
FIG. 2 is a block diagram illustrating a control subsystem and code processing subsystem for the preparation machine of FIG. 1 according to an embodiment of the present disclosure.

The control system 16, an example of which is illustrated in FIG. 2, is operable to control the preparation unit 14 to prepare the beverage/foodstuff. The control system 16 typically comprises: a user interface 36; a processor 38; optional sensors 40; a power supply 42; an optional communication interface 44, which are described sequentially.

The user interface 36 comprises hardware to enable a user to interface with the processor 38 and hence is operatively connected thereto. More particularly: the user interface receives commands from a user; the user interface signal transfers the said commands to the processor 38 as an input. The commands may, for example, be an instruction to execute a preparation process and/or to adjust an operational parameter of the preparation machine 4 and/or to power on or off the beverage preparation machine 4. The processor 38 may also output feedback to the user interface 36 as part of the preparation process, e.g. to indicate the beverage preparation process has been initiated or that a parameter associated with the process has been selected. The hardware of the user interface 36 may comprise any suitable device(s), for example, the hardware comprises one or more of the following: buttons, such as a joystick button or press button; joystick; LEDs; graphic or character LDCs; graphical screen with touch sensing and/or screen edge buttons.

The sensors 40 are operatively connected to the processor 38 to provide an input for monitoring of the preparation process and/or a status of the preparation machine 4. The input can be an analogue or digital signal. The sensors 40 typically comprise one or more of the following: fluid level sensors associated with the reservoir 24; flow rate sensors associated with the fluid pump 26; temperature sensors associated with the thermal exchanger 28. In the first and second embodiment of the preparation machine 4, the sensors may further comprise: fluid level sensors operable to measure a fluid level in the receptacle; sensors for measuring a temperature of a product in the receptacle; sensors for measuring the toque applied by the mixing head of the agitator unit 30 to the product; sensors for measuring the velocity of the mixing head of the agitator unit 30; receptacle detection sensors to detect the presence of the receptacle supported by the receptacle support 52. In the third embodiment of the preparation machine 4, the sensors may further comprise: position sensors associated with the preparation unit 14 that are operable to sense the position thereof; container 6 (i.e. capsule or packet) detection sensors to detect the presence of the container supplied by a user.

The processor 38 is operable to: receive an input, i.e. the commands from the user interface 36 and/or from the sensors 40; process the input according to program code stored on a memory unit (or programmed logic); provide an output, which is generally a preparation process. In particular the output may comprise: operating the code processing system 18 to determine preparation information on the container 6; operating the preparation unit 14 in accordance with the determined information. Operation of the preparation unit 14 can be open-loop control, or in certain particular (but non-limiting) embodiments, closed-loop control using the input signal from the sensors 40 as feedback. The processor 38 generally comprises memory, input and output system components, which are arranged as an integrated circuit, typically as a microprocessor or a microcontroller. The processor 38 may comprise other suitable integrated circuits, such as: an ASIC; a programmable logic device such as an FPGA; an analogue integrated circuit, such as a controller. For such devices, where appropriate, the aforementioned program code can be considered programmed logic or to additionally comprise programmed logic. The processor 38 may also comprise one or more of the aforementioned integrated circuits, i.e. multiple processors. The processor 38 generally comprises a memory unit 46 for storage of the program code and optionally data. The memory unit typically comprises: a non-volatile memory e.g. EPROM, EEPROM or Flash for program code and operating parameter storage; volatile memory (RAM) for data storage. The memory unit may comprise separate and/or integrated (e.g. on a die of the processor) memory.

The program code stored on a memory unit (or programmed logic) can be idealised as comprising a preparation program 48 that is executable by the processor 38 to execute said preparation process. Typically the preparation process comprises: determining the preparation information from the container (i.e. by interfacing with the code processing system 18); using to control said comprising the information and/or other information that may be stored as data on the memory unit 46 and/or input via the user interface 36. The determined information may as an alternative or in addition be used by the preparation program 48 or a device in communication therewith (e.g. a server communicating with the preparation machine over a network such as the internet via a communication interface): to monitor container 6 consumption for re-ordering; to scheduled maintenance of the preparation machine; to monitor machine usage.

The power supply 42 is operable to supply electrical energy to the processor 38 and associated components components. The power supply 42 may comprise various means, such as a battery or a unit to receive and condition a mains electrical supply. The power supply 42 may be operatively linked to part of the user interface 36 for powering on or off the preparation machine 4.

The communication interface 44 is for data communication of the beverage preparation machine 4 with another device/system, typically a server system. The communication interface 44 can be used to supply and/or receive information related to the preparation process, such as container consumption information and/or preparation process information. The communication interface 44 can be configured for cabled media or wireless media or a combination thereof, e.g.: a wired connection, such as RS-232, USB, I$^2$C, Ethernet define by IEEE 802.3; a wireless connection, such as wireless LAN (e.g. IEEE 802.11) or near field communication (NFC) or a cellular system such as GPRS or GSM. The communication interface 44 is operatively connected to the processor 38. Generally the communication interface comprises a separate processing unit (examples of which are provided above) to control communication hardware (e.g. an antenna) to interface with the maser processor 38. However, less complex configurations can be used e.g. a simple wired connection for serial communication directly with the processor 38.

Code Processing System

The code processing system 18 is operable: to obtain an image of a code on the container 6; to process said image to decode the encoded preparation information. The code processing system 18 comprises an: image capturing device 54; image processing device 56; output device 72, which are described sequentially.

The image capturing device 54 is operable to capture a digital image of the code and to transfer, as digital data, said image to the image processing device 56. To enable the scale of the digital image to be determined: the image capturing device 54 is arranged a predetermined distance away from the code when obtaining the digital image; in an example wherein the image capturing device 54 comprises a lens the magnification of the lens is, in certain non-limiting embodiments, stored on a memory of the image processing device 56. The image capturing device 54 comprises any suitable optical device for capturing a digital image consisting of the latter discussed micro-unit code composition; examples of suitable optical devices are: Sonix SN9S102; Snap Sensor S2 imager; an oversampled binary image sensor.

The image processing device 56 is operatively connected to the image capturing device 54 and is operable to process said digital data to decode preparation information encoded therein. Processing of the digital data is discussed in the following paragraphs. The image processing device 56 may comprise a processor such as a microcontroller or an ASIC. It may alternatively comprise the aforesaid processor 38, in such an embodiment it will be appreciated that the output device is integrated in the processor 38. For the said processing the image processing device 56 typically comprises a code processing program. An example of a suitable image processing device is the Texas Instruments TMS320C5517.

The output device 72 is operatively connected to the image processing device 56 and is operable to output digital data that comprises the decoded preparation information to the processor 38, e.g. by means of a serial interface.

Container

The container 6 may comprise, depending on the embodiment of the preparation machine 4 *a*: receptacle comprising preparation material for preparation and end-user consumption therefrom; a capsule or packet comprising preparation material for preparation therefrom. The container 6 may be formed from various materials, such as metal or plastic or a combination thereof. In general the material is selected such that it is: food-safe; it can withstand the pressure/temperature of the preparation process. Suitable examples of containers are provided following.

The container 6 when not in packet form generally comprises: a body portion 58 defining a cavity for the storage of a dosage of a preparation material; a lid portion 60 for closing the cavity; a flange portion 62 or other suitable arrangement for connection of the body portion and flange portion, the flange portion generally being arranged distal a base of the cavity. The body portion may comprise various shapes, such as a disk, frusto-conical or rectangular cross-sectioned. Accordingly, it will be appreciated that the capsule 6 may take various forms, an example of which are provided in FIG. 3A, which may generically extend to a receptacle/capsule as defined herein. The container 6 may be distinguished as a receptacle for end-user consumption therefrom when configured with an internal volume of 150-350 ml. In a similar fashion a capsule may by distinguished when configured with an internal volume of less than 100 ml. The container 6 in collapsible configuration may comprise an internal volume of 5 ml-250 ml.

Figure 3A:
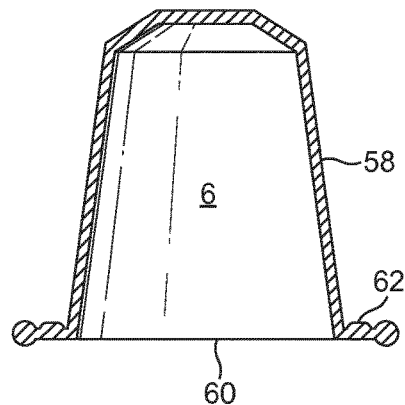
FIG. 3 is diagrammatic drawing illustrating containers for the preparation machine of FIG. 1 according to embodiments of the present disclosure.
Figure 3B:
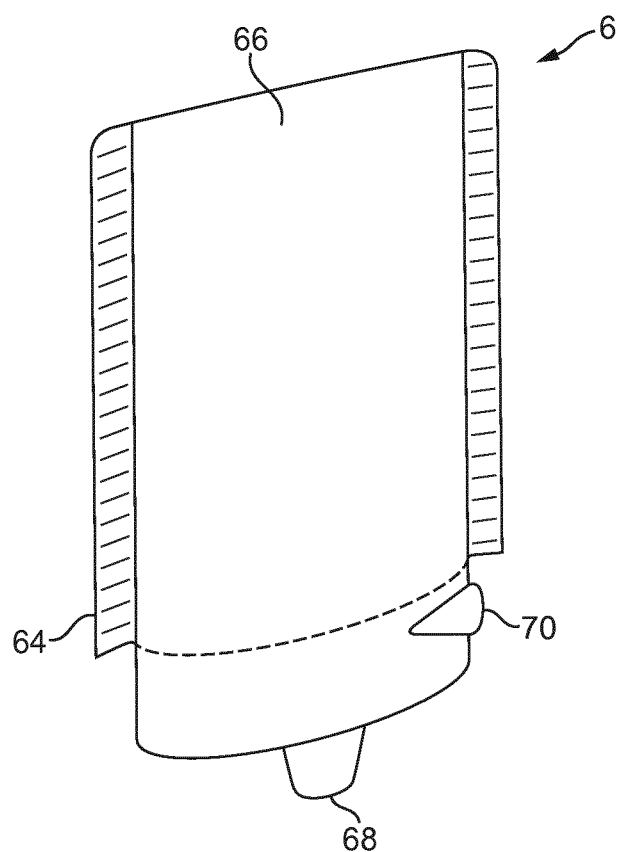

The container 6 when in packet form as shown in FIG. 3B generally comprises: an arrangement of sheet material 64 (such as one or more sheets joined at their periphery) defining an internal volume 66 for the storage of a dosage of a preparation material; an inlet 68 for inflow of fluid into the internal volume 66; an outlet 70 for outflow of fluid and beverage/foodstuff material from the internal volume. Typically the inlet 68 and outlet 70 are arranged on a body of an attachment (not shown), which is attached to the sheet material. The sheet material may be formed from various materials, such as metal foil or plastic or a combination thereof. Typically the volume 66 may be 150-350 ml or 200-300 ml or 50-150 depending on the application.

Information Encoded by Code

The container 6 comprises an arrangement of a plurality of codes 76, whereby each code encodes a phase, i.e. a distinct portion, of a preparation operation, there may for example be 3-10 sequential phases that the preparation operation is composed of.

Typically each code 74 encodes a phase that comprises preparation information, which generally comprises information related to the associated preparation process. Depending of the embodiment of the preparation machine 4 said information may encode one or more parameters, which may comprise one of more of a: fluid temperature (at container inlet and/or outlet to receptacle); fluid mass/volumetric flow rate; fluid volume; phase duration (e.g. a duration for applying the aforesaid parameters); container geometric parameters, such as shape/volume; other container parameters e.g. a container identifier, expiry date, which may for example be used to monitor container consumption for the purpose of container re-ordering.

Specifically in respect of the first embodiment preparation machine 4 said encoded parameters may comprise one or more of a: percentage cooling or heating power to apply (e.g. the power applied by the thermal exchanger 34); torque applied by the agitator unit 30; one or more angular velocities (e.g. a gyration and radial angular velocities W1, W2); container temperature (e.g. the temperature set by the thermal exchanger 34); time of a particular phase of preparation for which the aforesaid one or more parameters are applied for; phase identifier, e.g. an alphanumeric identifier, to identify which of a plurality of phases the aforesaid one or more parameters relate. More particularly, the code 74 may encode trigger parameters, whereby if a particular condition associated with the trigger parameters is met the associated phase of the preparation process is complete, and the next phase can be executed. Typically the trigger parameters are: duration; temperature; torque. Typically the said condition comprises, for at least one of the trigger parameters, measured parameter corresponding to a value encoded by a trigger parameter.

Arrangement of Code

The codes 76 are arranged on an exterior surface of the container 6 in any suitable position such that they can be processed by the code processing system 18. In the aforediscussed example of a receptacle/capsule, as shown in FIG. 3A, the codes 74 can be arranged in any exterior surface thereof, e.g. the lid, body or flange portion. In the aforediscussed example of a packet 6, as shown in FIG. 3B, the codes can be arranged in any exterior surface thereof, e.g. either or both sides of the packet, including the rim.

Figure 4A:
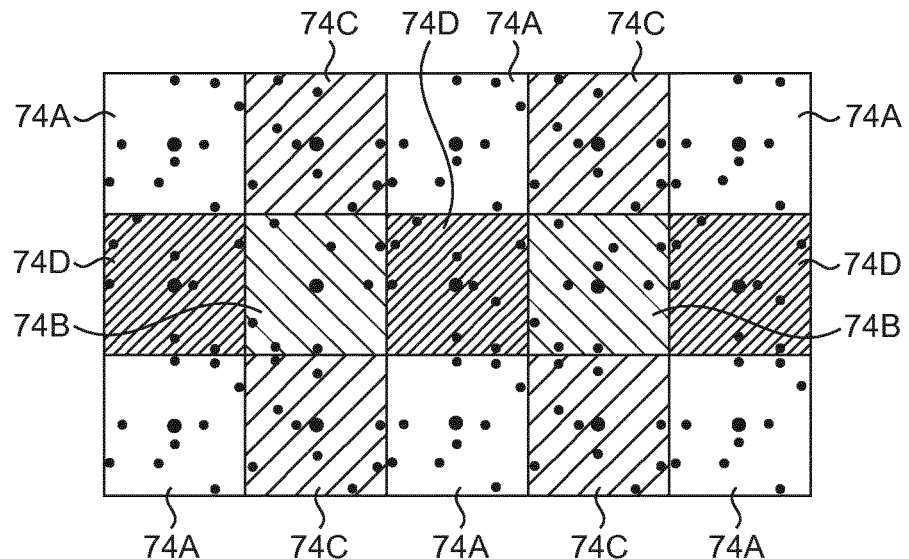
FIGS. 4-9 are plan views showing to scale codes and code arrangements for the containers of FIG. 3 according to embodiments of the present disclosure.

The codes 74 generally have a periphery that is repeatable with an at least partially tessellating arrangement. An example of such an arrangement is a right-angled parallelogram shape (i.e. a square or rectangle), which can be arranged in columns in an aligned or staggered formation. For the following first embodiment code 74 that has a circular encoding area, the encoding area is arranged within a square periphery to achieve such a shape. A further example is a hexagonal shape, which can be arranged with a honeycomb formation. For the following first and second embodiment codes 74, which have respective has a circular and rectangular encoding areas, the encoding area is arranged within a hexagonal periphery to achieve such a shape. In this way the codes can be compactly arranged together. The codes may be arranged adjacent to each other on at least one edge, i.e. they extend along a line which is at least one code wide. The codes may all have the same orientation. Alternatively, the adjacent codes may be rotated by one of 90°, 180°, 270°, an example of such an arrangement is shown in FIG. 4A, wherein 74A, 74B, 74C, 74D designates the respective rotation. Advantageously by having a more variable arrangement the coding on a container is less visible.

Figure 4B:
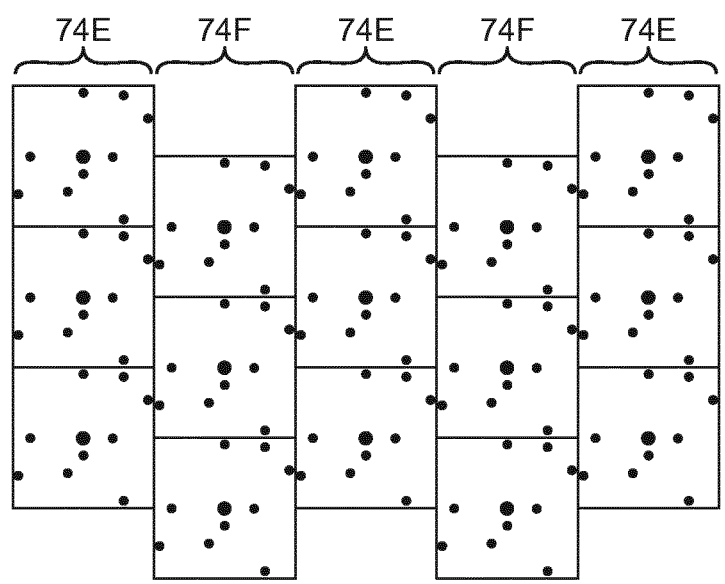

The codes are generally arranged along a line, herein termed a column, i.e. in a 1×i arrangement wherein i extends along the line. The line may be linear or non-linear, such as circumferentially extending. In certain non-limiting embodiments, there are a plurality of columns arranged adjacent each other and extending longitudinally along parallel said line, i.e. track arrangements. In FIG. 4A the arrangement may be considered to comprise 5 columns, each with a 1×3 arrangement. The columns may be aligned with each other (as illustrated in FIG. 4A) such that the rows, which extend perpendicular to the columns, are aligned. With such an arrangement a vertex of a code is common to four codes. Alternatively adjacent columns may be offset with respect to each other along said lines such that the rows are not aligned (an example of such an arrangement is illustrated in FIG. 4B, whereby adjacent columns are 74E, 74F). With such an arrangement a vertex of a code is common to two codes only. Advantageously by having a more variable arrangement coding is less visible.

The codes are generally arranged in a particular sequence according to the phase encoded, whereby said phases are arranged in an order according to use during the preparation process (e.g. the phases are arranged numerically along a column in order from 1-n, whereby phase 1 is used first, followed by 2 and so up to n). The order may also correspond to a reading direction in an example wherein the image capturing device 54 moves or has a focal position that moves relative the codes 74 as part of an image capturing process. Advantageously the location of the codes can be processed to determine conveniently the order of the phases encoded therein.

Generally the codes 74 are arranged into a plurality of coding regions, such as (but not limited to) 2-6 regions. Each coding region may comprise a plurality of codes with each code encoding the same phase (i.e. identical codes), whereby the coding regions have the aforesaid sequential arrangement (i.e. the coding regions are arranged in an order according to use of the phase encoded therein during the preparation process). Alternatively, each coding region may comprise a plurality of codes with the codes encoding the range of phases, whereby said plurality of codes in each coding region has the aforesaid sequential arrangement (i.e. the codes in the coding regions are arranged in an order according to the use of the phase during the preparation process). Examples both arrangements are described following.

Figure 5A:
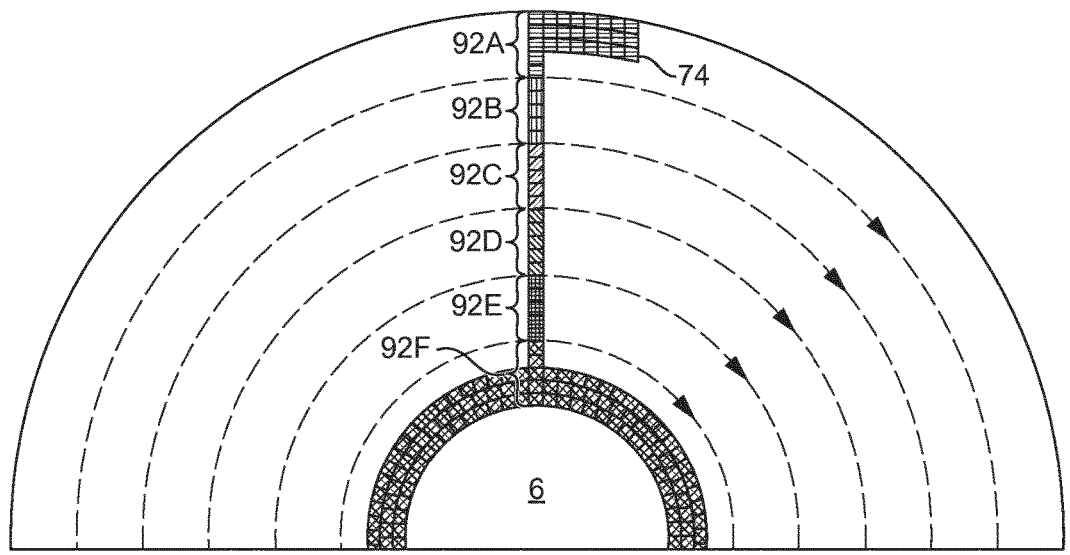

In a first embodiment arrangement each coding region 92 encodes the same phase, whereby the coding regions have said sequential arrangement, an example of which is illustrated in FIG. 5A (wherein only a portion of the coding regions 92 are shown). Herein the coding regions 92 are annular in shape and are concentric about a reference position, which is typically a centre of rotation of a container 6, which is preferably but not limited to a non-packet type container 6. The coding regions (five 92A, 92B, 92C, 92D, 92E are shown in the example) are arranged sequentially from a peripheral ring to an interior ring. Each ring comprises a plurality of codes 74 in the radial direction (5 are shown in the example). The first embodiment arrangement may alternatively be arranged rectilinear, i.e. a rectangular or square stack of coding regions or other suitable arrangement. In the illustrated example, an optional interior region 92F bounds the said coding regions 92A-E to define a start/stop coding region, as will be discussed.

Figure 5B:
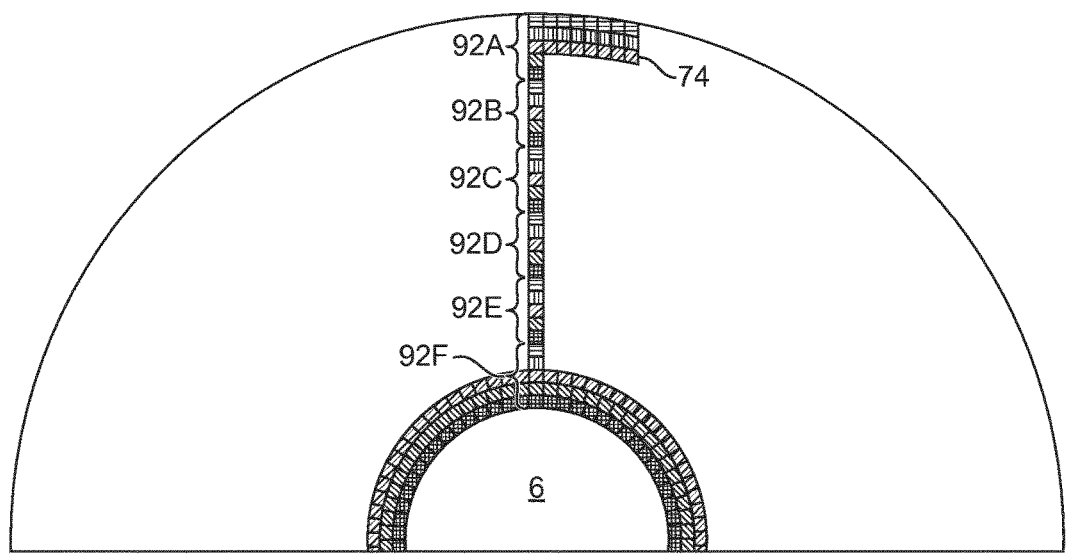

In a second embodiment arrangement, each coding region comprises a sequential arrangement of the phases, an example of which is illustrated in FIG. 5B (wherein only a portion of the coding regions are shown). Herein the coding regions 92 are again annular in shape and are concentric about a reference position. The coding regions (five 92A, 92B, 92C, 92D, 92E, 92F are shown in the example) are arranged sequentially from a peripheral ring to an interior ring. Each ring comprises a plurality of codes in the radial direction (5 are shown in the example), whereby each code encodes a different phase. The second embodiment arrangement may alternatively be arranged rectilinear, i.e. a rectangular or square stack of coding regions or other suitable arrangement.

Figure 5C:
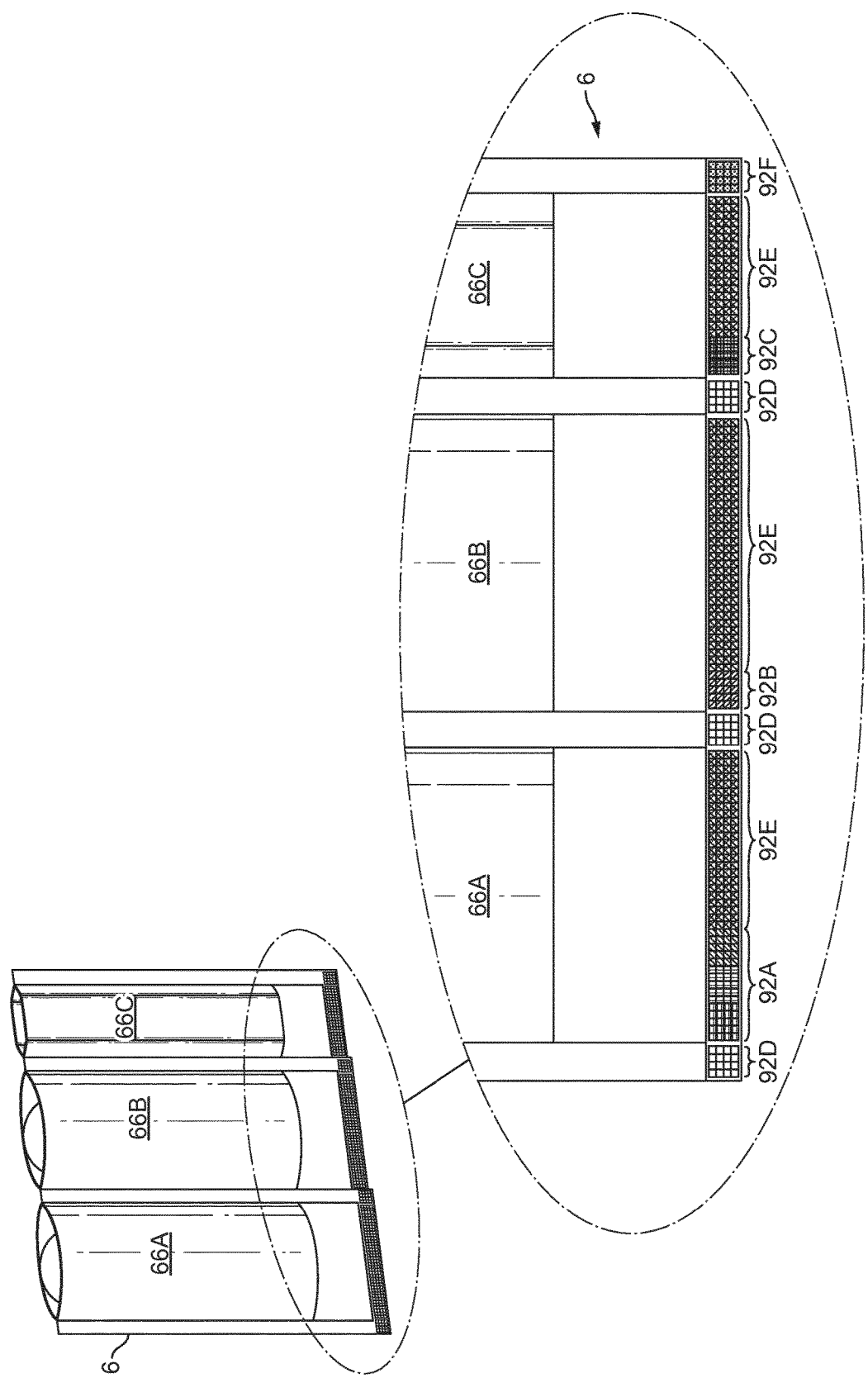

In a specific embodiment, an example of which is illustrated in FIG. 5C, the container 6 is in packet form and comprises a plurality of internal volumes 66 (herein three 66A, 66B, 66C are illustrated) each for containing preparation material. Each internal volume 66 has associated therewith one or more coding regions (92A, 92B, 92C), which may be encoded according to the first or second embodiment coding region (the first embodiment is illustrated). For each internal volume 66 the associated coding regions extend along a rim (as illustrated) or other portion thereof. In the illustrated example: the first internal volume 66A has associated therewith 3 coding regions 92A; the second internal volume the second internal volume 66B has associated therewith 1 coding region 92B; the third internal volume 66C has associated therewith 1 coding region 92C. In the illustrated example, optional regions 92D, 92E, 92F bounding the said coding regions 92 define start and stop coding regions as will be discussed. In such an embodiment the code processing system 18 decodes preparation information specific to each internal volume 66 using said regions 92 associated therewith.

An end of the said sequential arrangements may comprise further coding regions with codes that encode information to identify a start and end of said sequence. In the first and second embodiments coding regions said further coding regions are arranged at one or both ends, e.g. in the illustrated example in FIG. 5A an end coding region 92F is arranged adjacent the interior ring 92E. In the specific embodiment of FIG. 5C: a start coding region 92D is arranged to the left of each coding region 92A, 92B, 92C; a null/end coding region 92E is arranged to the right of each coding region 92A, 92B, 92C; an overall end coding region 92F is arranged to the right of each coding region 92C. The start and/or end regions 92 may, when using the following preferred (but not by way of limitation) example codes, be encoded: as a particular arrangement of one or more of the data units 82; a specific distance d for a particular parameter.

As an alternative (or in addition) to having the aforesaid further coding regions one or more of the codes (such as (but not limited to) all) may encode as the preparation information (or in addition thereto) a phase identifier to identify an order of the phase used during said preparation process. The phase identifier can be processed by the code processing system 18 to determine an associated phase number/order. In certain non-limiting embodiments, the phase identifier is numeric or alphanumeric and is encoded discretely, i.e. it can assume one or a plurality of predetermined values. In the following particular (but non-limiting) example codes 74 the phase identifier may be encoded as a particular distance d for a particular parameter. With an encoded phase identifier it will be appreciated that it possible to have an arbitrary arrangement of codes, i.e. as opposed to an organised arrangement such as those of the first and second embodiments. Advantageously the visibility of the codes 74 can be reduced.

Particular (but Non-limiting) Composition of Code

The code 74 is configured to encode the preparation information in a manner for capturing by the image capturing device 54. More particularly, the code is formed of a plurality of units 76, such as (but not limited to) micro-units, with a surround of a different colour: typically the units comprise a dark colour (e.g. one of the following: black, dark blue, purple, dark green) and the surround comprises a light colour (e.g. one of the following: white, light blue, yellow, light green) or the converse, such that there is sufficient contrast for the image processing device 56 to distinguish therebetween. The units 76 may have one or a combination of the following shapes: circular; triangular; polygon, in particular a quadrilateral such as square or parallelogram; other known suitable shape. It will be appreciated that due to formation error, e.g. printing error, the aforesaid shape can be an approximation of the actual shape. The units 76 typically have a unit length of 50-200 µm (e.g. 60, 80, 100, 120, 150 µm). The unit length is a suitably defined distance of the unit, e.g.: for a circular shape the diameter; for a square a side length; for a polygon a diameter or distance between opposing vertices; for a triangle a hypotenuse. In certain non-limiting embodiments, the units 76 are arranged with a precision of about 1 µm.

Whilst the code is referred to as comprising a plurality of units it will be appreciated that the units may alternatively be referred to as elements or markers.

Typically the units 76 are formed by: printing e.g. my means of an ink printer; embossed; engraved; otherwise known means. As an example of printing the ink may be conventional printer ink and the substrate may be: polyethylene terephthalate (PET); aluminium coated with a lacquer (as found on Nespresso™ Classic™ capsules) or other suitable substrate. As an example of embossing the shape may be pressed into a plastically deformable substrate (such as the aforesaid aluminium coated with a lacquer) by a stamp.

The units 76 are organised into a: data portion 78 to encode the preparation information; reference portion 80 to provide a reference for the data portion 78. The reference portion 80 comprises a plurality of reference units 86, the centres of which have a linear arrangement to define a reference line r. One of the reference units 86 generally is a reference line r orientation identifier 88, which is identified to determine the orientation of said line. The data portion 78 may comprise an encoding area 90, within the bounds of which the data units 82 are arranged. A data unit 82 is arranged on an encoding line D that intersects the reference line r. Generally the data unit is able to occupy any continuous distance d along the data line D, as opposed to discrete positions only (i.e. discrete meaning predetermined positions only), as a variable to encode a parameter of the preparation information. In this respect a wider range of information may be encoded. The data portion 78 comprises n data units 82, wherein n is numerically 1 or more, and thus generally encodes n parameters. In a similar fashion the reference portion 80 comprises m reference units 86, wherein m is numerically at least two.

More particularly the encoding line D intersects the reference line r at a reference position 84. A reference position 84 may or may not comprise a reference unit 86. The distance d is defined from the reference position to a position on the encoding line D which a centre of the data unit 82 is arranged on, or arranged proximate thereto, e.g. at a position on the encoding line D which is intersected by a line through the centre of the data unit 82, whereby said line is orthogonal to the encoding line D at the point of intersection.

Code with Polar Coordinate Arrangement

Figure 6:
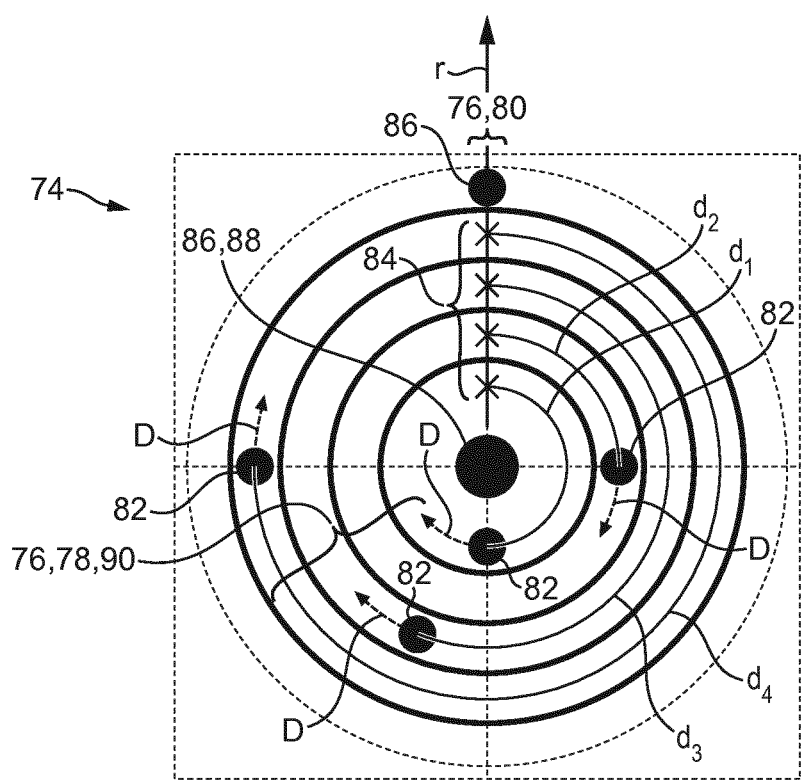

According to a first embodiment of the code 74, an example of which is illustrated in FIG. 6, the code comprises a circular planform. Typically the planform has a diameter of 600-1600 µm, or about 1100 µm, which will depend on the number of parameters encoded. Note in FIGS. 6 (and 7 following) the reference line r and encoding line D are shown for illustrative purposes only, that is to say they do not require physical formation as part of the code, rather they can be defined virtually when an image of the code is processed as will be discussed.

The reference portion 80 comprises m reference units 86, (two are illustrated) with a linear arrangement. The said reference units 86 define the reference line r. One of the reference units 86 is the reference line orientation identifier 88, which enables determination of the orientation of the reference line r and associated reference positions 84, e.g. each reference position 84 is a predetermined distance (such as 100-200 µm or 160 µm) along the reference line r from the orientation identifier 88. The orientation identifier 88 may be identifiable as one or a combination of: a reference unit 86 that does not have associated therewith a data unit 82; a one or more of a different shape, colour, size from the other units; a reference unit arranged at an end of the reference line r. In certain non-limiting embodiments, as illustrated, the reference unit comprises a different size to the other units of the code, (e.g. it has a diameter of 120 µm and the other units are 60 µm). It also preferable (but not by way of limitation), as illustrated, to arranged the orientation identifier 88 at the centre of said circular planform. In certain non-limiting embodiments, the reference line r is comprised of two reference units, i.e. the orientation identifier 88 and a further reference unit 86. The further reference unit is identifiable by one or more of the following: its arrangement at a greater radial position from the orientation identifier 88 than the data units; its arrangement at a predetermined reserved radial position from the orientation identifier 88, whereby the data units are not arranged at said predetermined radial position; it is distinct from the other units of the code in terms of one of more of the following: shape, size, colour. Advantageously, the reference line r can be conveniently determined by locating the orientation identifier 88 and a further reference unit 86.

Numbering of the reference positions 84 herein comprises the lowest number reference position 84 proximate the orientation identifier 88, increasing consecutively to the highest number reference position 84 distal thereto, as indicated by the corresponding distances $d_{1-n}$.

The reference line r may be arranged a predetermined minimum distance away from the encoding area 90 of the data portion 78, e.g. by 50 µm-150 µm or 100 µm, to ensure adequate separation of the reference units 86 and data units 82, i.e. a radially extending portion is cut from its annular shape.

Alternatively, as shown in the illustrated example, the reference line r extends through the encoding area 90, i.e. it radially intersects its annular shape.

The data portion 78 generally comprises an annular encoding area 90 wherein the data units 82 thereof are arranged, whereby the reference line r extends radially from a centre of the annular encoding area 90. The encoding lines D are semi or fully circular, concentric and extending from the reference line r about the centre of the annular encoding area 90. There are n data units 82 (four are illustrated) with each arranged at a circumferential distance d along the line D from the reference line r. A point of intersection between the encoding line D and reference line r is locally orthogonal and defines the reference position 84. Each data unit 82 may have a corresponding reference unit 86 at the associated reference position 84. Alternatively (as shown in the figure), in certain non-limiting embodiments, there is no reference unit at the reference position 84, whereby the reference position 84 is defined virtually, e.g. it is interpolated by a predetermined distance from an adjacent reference unit 86.

More than one data unit 82 can be arranged along an encoding line D, e.g. so that multiple parameters are encoded on an encoding line D or so that each parameter has multiple values associated therewith, examples of which will be provided. A value of a parameter is encoded by the circumferential distance d of the data unit 82 from its associated reference position 84.

The shaded regions arranged co-axial the encoding lines D define the bounds of positions of associated data units 82. Although they are shown shaded for illustrative purposes, they are preferably (but not by way of limitation) virtually defined by program code of the image processing device 56.

Each data unit 82 (or further data units) optionally encodes metadata about an associated parameter. The metadata is generally encoded discretely, i.e. it can only assume certain values. Various examples of encoding the metadata are given following.

Figure 7A:
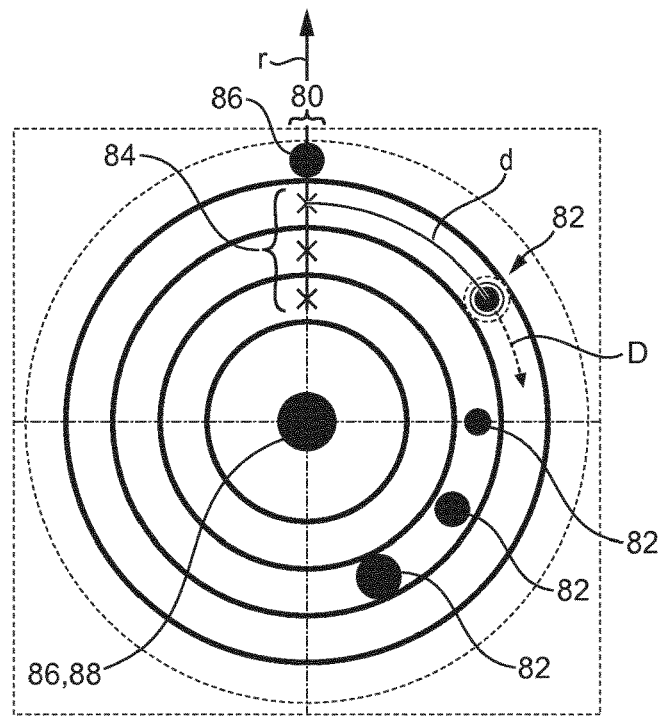

In a first embodiment, an example of which is illustrated in FIG. 7A, a metadata is encoded as a characteristic size (e.g. the size defined by the above-defined unit length or area) of the data unit 82, the size being identifiable as a variable by the image processing device 56. Particularly, the size may be one of a list of 2 or 3 or 4 particular sizes, e.g. selected from 60, 80, 100, 120 µm. In a particular example, which is illustrated at the third reference position 84, the size of the data unit 82 may be one of three sizes. In a particular example, which is illustrated at the second reference position 84, there are three parameters encoded, the data unit 82 of each parameter being identifiable by the metadata of the three different sizes.

Figure 7B:
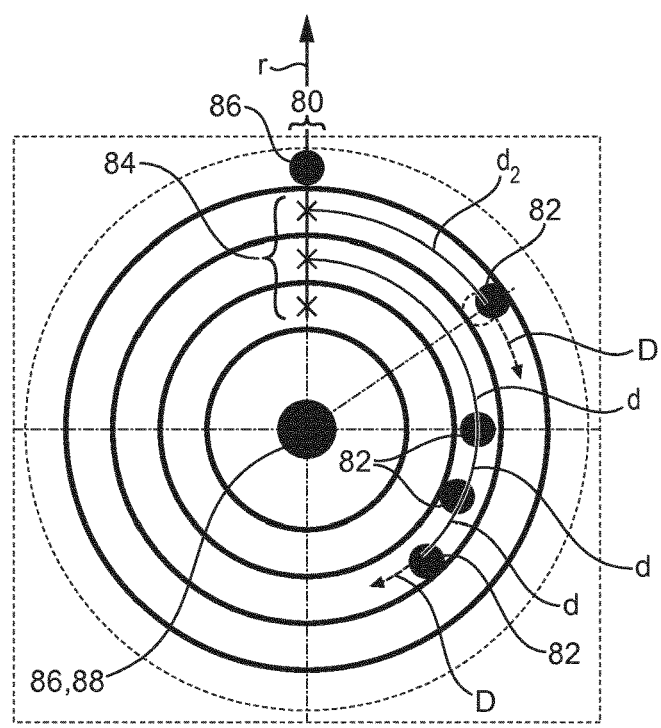

In a second embodiment, an example of which is illustrated in FIG. 7B, metadata is encoded as a characteristic position of the data unit 82 with respect to the arrangement of the data unit 82 in a direction orthogonal to the encoding line D (i.e. a radial distance and/or a distance orthogonal to a tangent drawn from the encoding line D). In spite of the offset the encoding line D still intersects the data unit 82. In particular: the data unit 82 may be offset in a first or second position with respect to the encoding line D to encode two values of the metadata; the data unit 82 may be offset in the first or second position or arranged in a third position on the encoding line D to encode three values of the metadata. The first and second position may be defined by a centre of the data unit 82 arranged a particular distance away from the encoding line D, e.g. at least 20 µm. The third position may be defined by a centre of the data unit 82 arranged less than a particular distance away from the encoding line D, e.g. less than 5 µm. In a particular example, which is illustrated at the third reference position 84, the data unit 82 may be in a first or second position to encode metadata. In a particular example, which is illustrated at the second reference position, the said reference position has three parameters encoded therewith, the data unit 82 of each parameter being identifiable by the metadata of the position of the data unit 82.

Figure 7C:
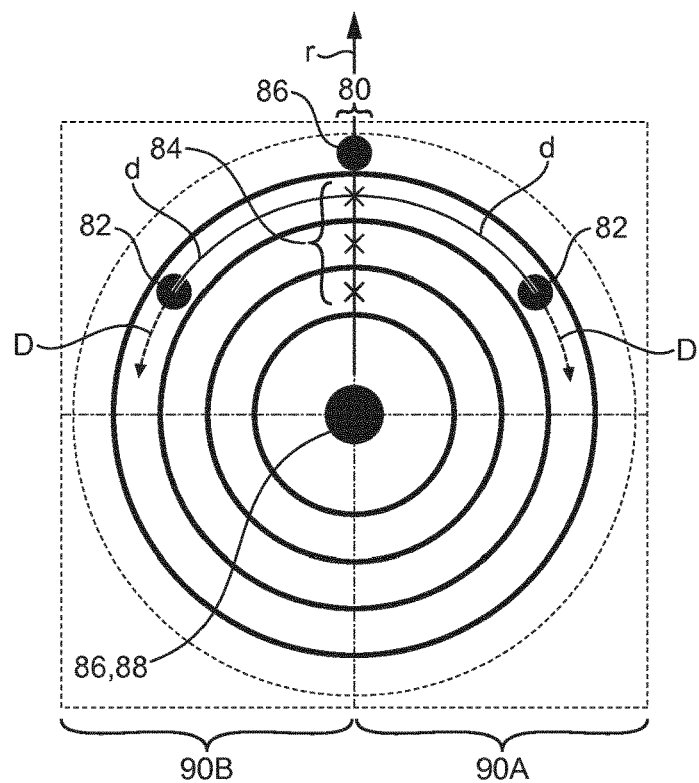

In a third embodiment, an example of which is illustrated in FIG. 7C in the third reference position, metadata is encoded as a characteristic position of one or two data units 82 with respect to their arrangement on either side of the reference line r. As examples: a data unit 82 on the left of the reference line r may encode a negative of the parameter and a data unit 82 one the right of the reference line r may encode a positive of the parameter or the converse; for the same parameter a data unit 82 on the left of the reference line r may encode a mantissa, a data unit 82 one the right of the reference line r may encode an exponent or the converse arrangement; a data unit 82 on the left of the reference line r may encode the same parameter as that on the right such that an average can be taken for enhanced accuracy. In certain non-limiting embodiments, the encoding area 90 may be separated into two distinct semi-circular sub-sections 90A, 90B each having an associated data unit 82 arranged therein, e.g. the maximum distance d for either is on the reference line r in the second quadrant (or proximal thereto such that two data units are not arranged coincident.

Figure 7D:
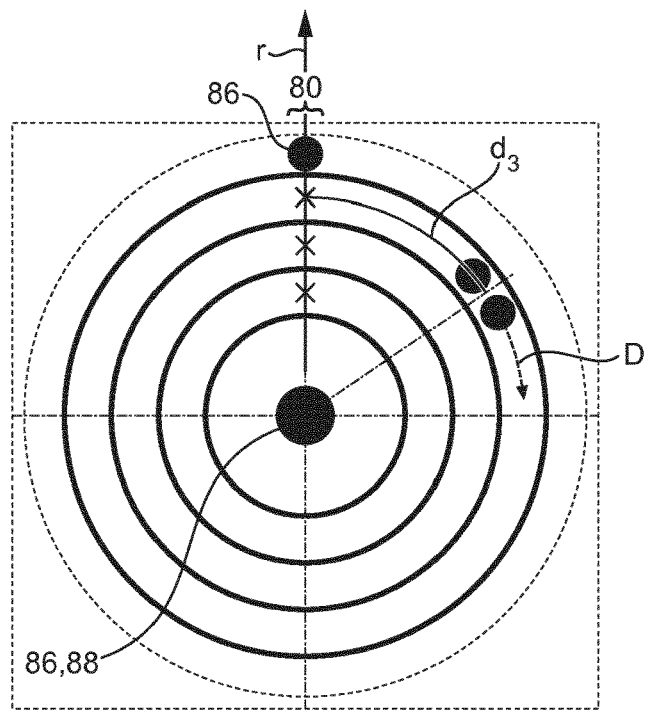

In a fourth embodiment, an example of which is illustrated in FIG. 7D, metadata is encoded as a plurality of data units 82 arranged along the encoding line D, each with a different associated distance $d_n$. Advantageously an overall distance d can be determined with increased accuracy as a function (typically an average) of the distances $d_n$. In the illustrated example two data units 82 are shown wherein $d=0.5(d_1+d_2)$.

In a fifth embodiment (not shown) metadata is encoded as a characteristic shape. For example the shape may be one of a list of: circular; triangular; polygon. In a sixth embodiment (not shown) metadata is encoded as a characteristic colour. For example the colour may be one of a list of: red; green; blue, suitable for identification by an RGB image sensor.

The first-sixth embodiments may be suitably combined, e.g. an encoded parameter may have metadata encoded with a combination of the first and second embodiment.

Figure 7E:
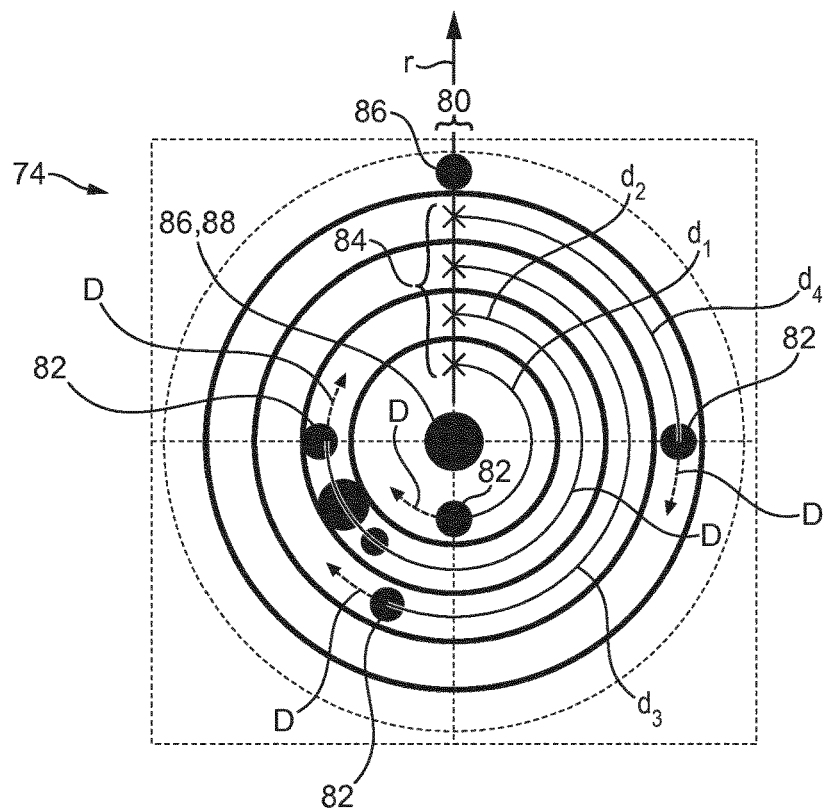

A specific example of the code 74 for the first embodiment of the preparation machine 4, is illustrated in FIG. 7E, wherein: the first, third and fourth reference positions 86 have a data unit 82 that encodes a parameter without any metadata the; second reference position 84 has three data units 82, each encoding a parameter, the parameter having metadata encoded according to a combination of the first and second embodiment (i.e. 3 values for the size of the unit and 3 values for the position of the unit, hence a total of 9 possible values of the metadata).

In particular: the first reference position 84 encodes a percentage cooling power to apply; the third and fourth reference positions 84 encode either of the radial angular velocity W1 and the gyration angular velocity W2; the second reference position encodes time, temperature, torque as the respective small, medium and large data units in particular positions, whereby these parameters represent triggers such that when a condition set by one of them is achieved then the phase encoded by the code 74 is compete.

Code with Cartesian Coordinate Arrangement

Figure 8:
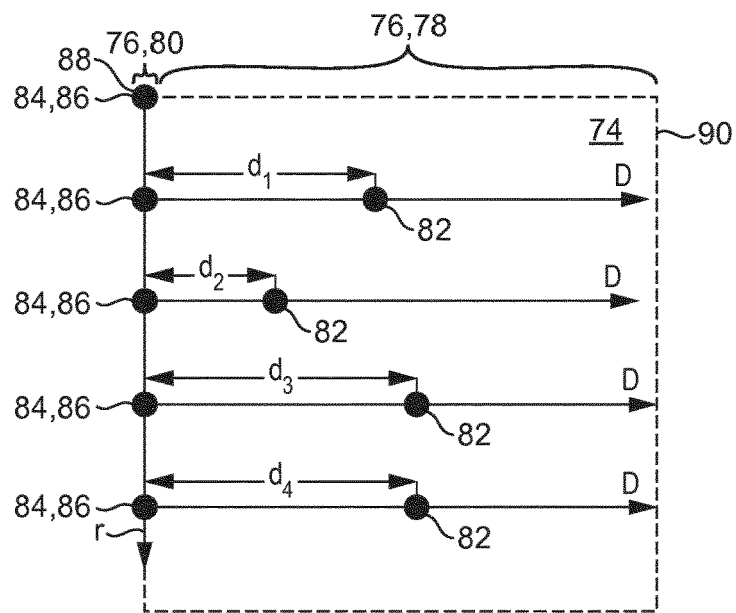

According to a first embodiment of the code 74, an example of which is illustrated in FIG. 8, the code comprises a right-angled parallelogram planform, i.e. a square or rectangle. Typically the planform has a side length of 600-1600 µm, or about 1100 µm, which will depend on the number of parameters encoded. Note in FIGS. 8 (and 9 following) the reference line r and encoding line D are shown for illustrative purposes only, that is to say they do not require physical formation as part of the code, rather they can be defined virtually when an image of the code is processed as will be discussed.

The reference portion 80 comprises m reference units 86, (five are illustrated) with a linear arrangement. The said reference units 86 define the reference line r. One of the reference units 86 defines a reference line orientation identifier 88, which enables determination of the orientation of the reference line r and associated reference positions 84, e.g. each reference position 84 is a predetermined distance (such as 100-200 μm or 160 μm) along the reference line r from the orientation identifier 88. The orientation identifier 88 may be identifiable as one or a combination of: a reference unit 86 that does not have associated therewith a data unit 82; a different shape from the other reference units; a reference unit arranged at an end of the reference line r, in the illustrated example the latter is shown. Numbering of the reference positions 84 herein comprises the lowest number reference position 84 proximate the orientation identifier 88, increasing consecutively to the highest number reference position 84 distal thereto, as indicated by the corresponding distances $d_{1-n}$.

As shown in the illustrated example, the reference line r may be arranged a predetermined minimum distance away from the encoding area 90 of the data portion 78, e.g. by 50 μm-150 μm or 100 μm, to ensure adequate separation of the reference units 86 and data units 82. Alternatively the reference line r bounds the encoding area 90.

The data portion 78 comprises an encoding area 90, which may be 600-1200 μm, such as (but not limited to) about 800 μm) wherein the data units 82 thereof are arranged. There are n data units 82 (four are illustrated) with each arranged at a perpendicular distance d along an encoding line D from the reference line r. A point of intersection between D and r defines the reference position 84. Each data unit 82 may have a corresponding reference unit 86 at the associated reference position 84 (as shown in the figure). Alternatively there is no reference unit at the reference position 84, whereby the reference position 84 is defined virtually, e.g. it is interpolated by a predetermined distance from an adjacent reference unit 86. More than one data unit 82 can be arranged along an encoding line D, e.g. so that multiple parameters are encoded on an encoding line D or so that each parameter has multiple values associated therewith, examples of which will be provided. A value of a parameter is encoded by the perpendicular distance d of the data unit 82 from its associated reference position 84.

Each data unit 82 (or further data units) optionally encodes metadata about an associated parameter. The metadata is generally encoded discretely, i.e. it can only assume certain values. Various examples of encoding the metadata are given following.

Figure 9A:
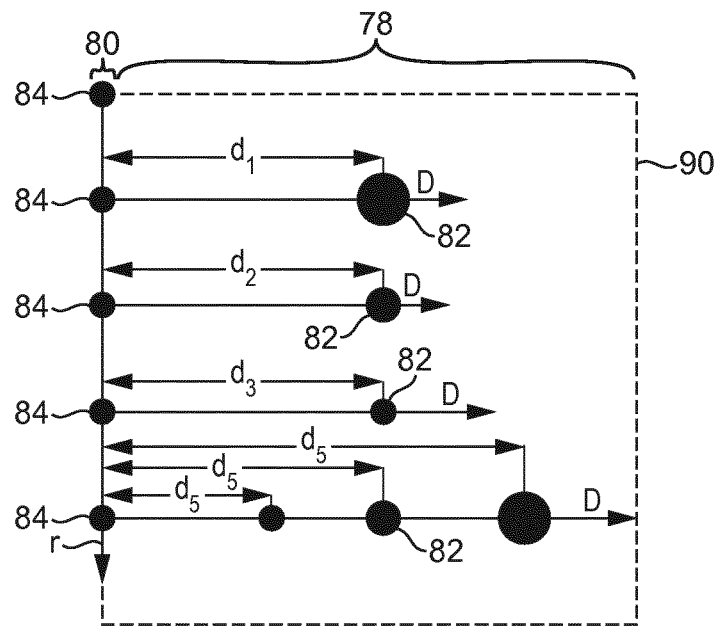

In a first embodiment, an example of which is illustrated in FIG. 9A, a metadata is encoded as a characteristic size (e.g. the size defined by the above-defined unit length or area) of the data unit 82, the size being identifiable as a variable by the image processing device 56. Particularly, the size may be one of a list of 2 or 3 or 4 particular sizes, e.g. selected from 60, 80, 100, 120 μm. In a particular example, which is illustrated at the first-third reference positions 84, the size of the data unit 82 may be a one of three sizes. In a particular example, which is illustrated at the fourth reference position 84, there are three parameters encoded, the data unit 82 of each parameter being identifiable by the metadata of the three different sizes.

Figure 9B:
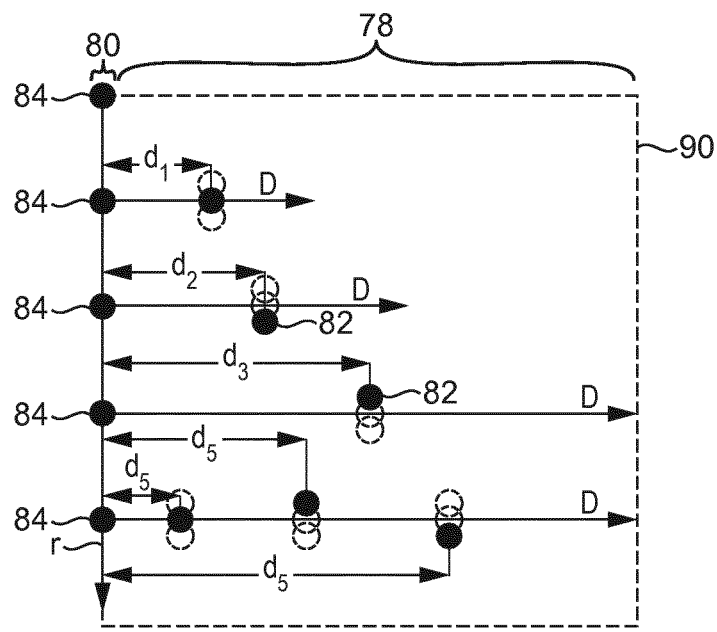

In a second embodiment, an example of which is illustrated in FIG. 9B, metadata is encoded as a characteristic position of the data unit 82 with respect to the arrangement of the data unit 82 in a direction parallel to the reference line r. In spite of the offset the encoding line D still intersects the data unit 82. In particular: the data unit 82 may be offset in a first or second position with respect to the encoding line D to encode two values of the metadata; the data unit 82 may be offset in the first or second position or arranged in a third position on the encoding line D to encode three values of the metadata. The first and second position may be defined by a centre of the data unit 82 arranged a particular distance away from the encoding line D, e.g. at least 20 μm. The third position may be defined by a centre of the data unit 82 arranged less than a particular distance away from the encoding line D, e.g. less than 5 μm. In a particular example, which is illustrated at the first-third reference positions 84, the data unit 82 may be in a first, second or third position to encode metadata. In a particular example, which is illustrated at the fourth reference position, the said reference position has three parameters encoded therewith, the data unit 82 of each parameter being identifiable by the metadata of the position of the data unit 82.

Figure 9C:
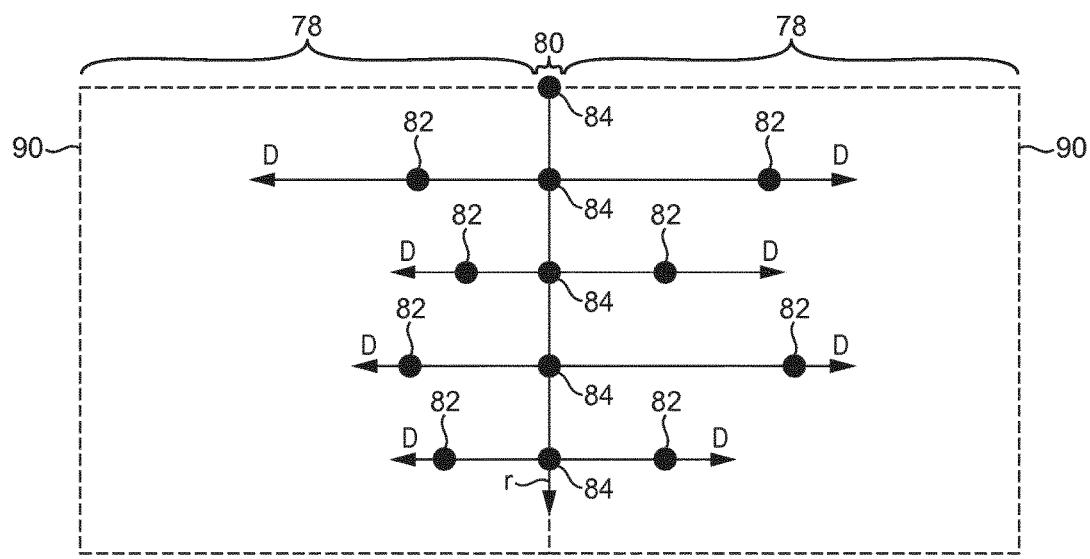

In a third embodiment, an example of which is illustrated in FIG. 9C, metadata is encoded as a characteristic position of one or two data units 82 with respect to their arrangement on either side of the reference line r. As examples: a data unit 82 on the left of the reference line r may encode a negative of the parameter and a data unit 82 one the right of the reference line r may encode a positive of the parameter or the converse; for the same parameter a data unit 82 on the left of the reference line r may encode a mantissa, a data unit 82 one the right of the reference line r may encode an exponent or the converse arrangement; a data unit 82 on the left of the reference line r may encode the same parameter as that on the right such that an average can be taken for enhanced accuracy.

Figure 9D:
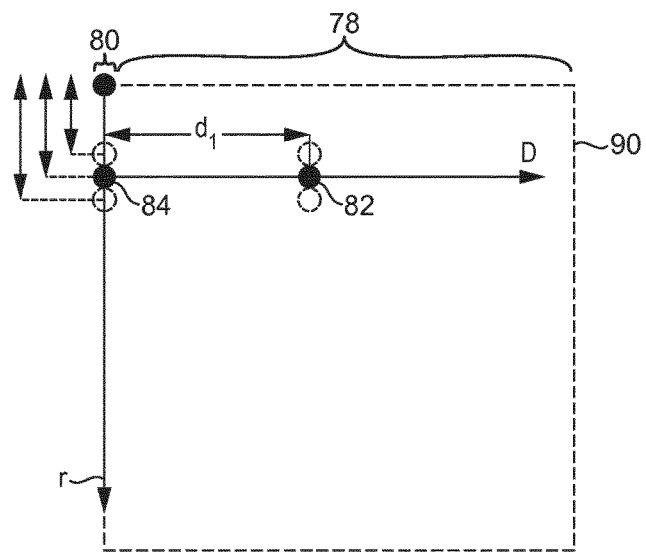

In a fourth embodiment, an example of which is illustrated in FIG. 9D, metadata is encoded as a characteristic position of the data unit 82 with respect to the arrangement of the data unit 82 along the reference line r from the orientation identifier 88. The fourth embodiment is similar to the second embodiment however the associated reference unit 86 moves with the data unit 82, e.g. to define 2 or 3 (as illustrated) positions.

In a fifth embodiment (not shown) metadata is encoded as a characteristic shape. For example the shape may be one of a list of: circular; triangular; polygon. In a sixth embodiment (not shown) metadata is encoded as a characteristic colour. For example the colour may be one of a list of: red; green; blue, suitable for identification by an RGB image sensor.

The first-sixth embodiments may be suitably combined, e.g. an encoded parameter may have metadata encoded with a combination of the first and second embodiment.

Figure 9E:
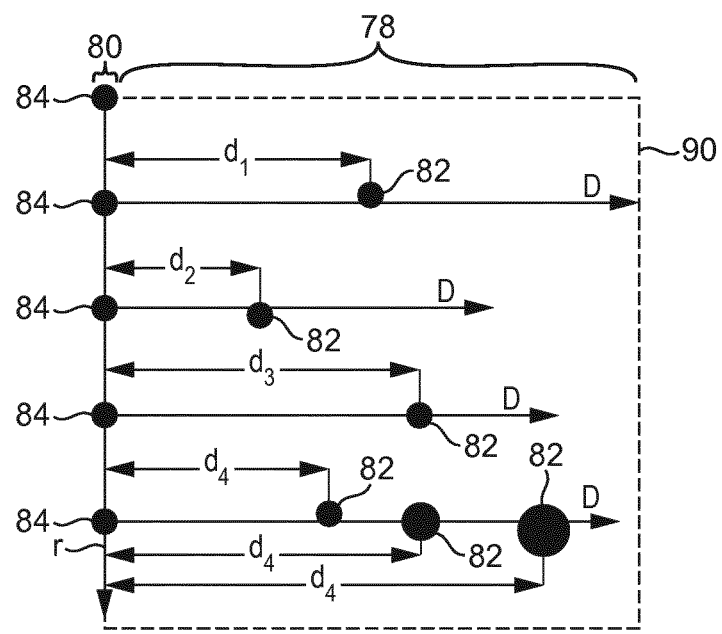

A specific example of the code 74 for the first embodiment of the preparation machine 4, is illustrated in FIG. 9E, wherein: the first reference position 84 and second reference position 84 have associated data units 82 that encode parameters that have metadata encoded according to the second embodiment (i.e. 2 values for the metadata); the third reference position 86 has a data unit 82 that encodes a parameter without any metadata; the fourth reference position 84 has three data units 82, each encoding a parameter, the parameter having metadata encoded according to a combination of the first and second embodiment (i.e. 3 values for the size of the unit and 3 values for the position of the unit, hence a total of 9 possible values of the metadata).

In particular: the first and second reference positions 84 encode the respective radial angular velocity W1 and the gyration angular velocity W2, with optionally the position above and below the associated encoding line D designating respective positive and negative angular velocities; the third reference position 84 encodes a percentage cooling power to apply; the fourth reference position encodes time, temperature, torque as the respective small, medium and large data units in particular positions, whereby these parameters represent triggers such that when a condition set by one of them is achieved then the phase encoded by the code 74 is compete.

Method of Processing Code

The code processing system 18 processes individual codes according to the above examples to determine the preparation information by: obtaining by means of the image capturing device 54 a digital image of the code; processing by means of the image processing device 56 digital data of the digital image to decode the preparation information; outputting by means of the output device 72 said decoded preparation information.

Processing of the digital data comprises: locating the units 82, 86 in the code; identifying the reference units 86 and determining therefrom a reference line r, determining for each data unit 82 a distance d along the encoding line D from the reference line r, each of which will be described sequentially.

Locating the units 82, 86 in the code is generally achieved by conversion of the pixels represented in the digital data to a one-bit bi-tonal black and white image, i.e. a binary image, whereby the associated conversion parameters are set to distinguish the units from their surrounding base level. Alternatively an oversampled binary image sensor may be used as the image capturing device 54 to provide the binary image. Locations of the centre of units may be determined by a feature extraction technique such as circle Hough Transform. Different sized units may be identified by pixel integration.

Identification of the reference units 86 and determining therefrom a reference line r, is generally achieved by identification of one or a combination of: units that have a linear arrangement; units that are a predetermined and/or greatest distance apart; units that are a particular shape or size. An orientation identifier 88 of the reference line r can be determined by: a reference unit 86 that is a difference shape or size from the other reference units; a reference unit 86 that does not have associated therewith a data unit 82 on an encoding line D. For a code with a polar coordinate system, in certain non-limiting embodiments, the reference line r is determined by identifying a reference unit corresponding to the orientation identifier 88 that is arranged at a centre of a circle defined by the circular extending encoding lines D and determining a reference unit with a predetermined/greatest radial distance therefrom.

For a code with a Polar coordinate system, determining for each data unit 82 a distance d along the encoding line D from the associated reference position 84 of the reference line r is generally achieved by determining the circumferential distance from the centre of a data unit 82 to the associated reference position 84, (e.g. by the product of: an angle in radians at the reference position 88 between the reference line r and a radial line to the data unit 82; and the overall circumference of the encoding line D).

For Polar and Cartesian coordinate codes, a determined distance can be corrected using the magnification and/or distance of the image capturing device 54 away from the code 74 when the image was captured.

To determine a value $V_p$ of the parameter associated with the determined distance d, stored information can be utilised that defines a relationship between the parameter and distance d. This step may be performed at the image processing device 56 or processor 38. The relationship may be linear, e.g. $V_p \propto d$. Alternatively it may be non-linear. A non-linear relationship may comprise a logarithmic relationship, e.g. $V_p \propto \log(d)$ or an exponential relationship, e.g. $V_p \propto e^d$. Such a relationship is particular advantageous when the accuracy of a parameter is important at low values and less important at high values or the converse e.g. for the first embodiment of the preparation machine 4 the accuracy of the angular velocities W1, W2 of the mixing unit is more important at a low angular velocity than at a high angular velocity, hence a logarithmic relationship is preferable (but not limiting of the scope of the present disclosure).

For a code with a Polar coordinate system, as the circumference of the encoding lines D decreases with proximity to the centre of the annular encoding area 90 (i.e. the orientation identifier 88 in the illustrated examples) the accuracy of the determined distance d is less proximate the said centre. Advantageously, the parameters that require a higher level of precision can be arranged distal said centre and those that do not require a high level of precision can be arranged proximal said centre.

The aforesaid metadata about the parameter can be determined depending on the embodiment of encoding, e.g.: in the first example by determining for the associated data unit 82 a unit length by feature extraction or overall area by pixel integration; in the second example by determining for the associated data unit 82 an offset to the encoding line D by feature extraction; in the third and fourth example by determining the centre of the associated data units by feature extraction.

An image/plurality of images comprising the different codes 74 can be obtained (i.e. not necessarily an image(s) of every code on the container 6, merely sufficient codes/regions to derive all the encoded phases). The individual codes 74 in the image can be processed in the above manner to decode for each phase (i.e. each code) the associated encoded preparation information. The arrangement of the phases can be determined by a reading order of the phases/regions and/or by a phase identifier encoded in the codes 74. Rather than process each code 74 in the said image(s), the process may be terminated once sufficient codes have been processed to determine all the encoded phases. The preparation process can then be executed using the preparation information for each phase in the determined phase order.

Machine and Container Attachments

Figure 10:
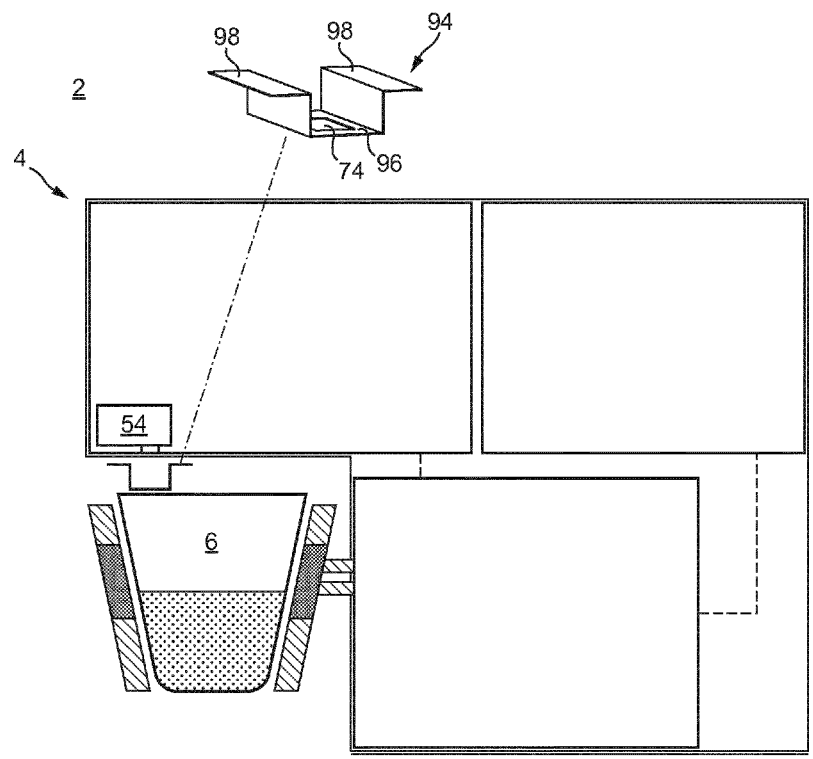
FIG. 10-11 are diagrammatic drawings illustrating attachments for the system of FIG. 1 according to embodiments of the present disclosure.

An attachment 94 may comprise the afore-described code 74 arranged on a surface thereof, the attachment 94 configured for attachment to the afore-described beverage or foodstuff preparation machine 4. The attachment, an example which is illustrated in FIG. 10, comprises: a carrier 96 for carrying the code 74; an attachment member 98 for attachment of the carrier 96 to the machine 4 between an image capturing device 54 of said machine 4 and a container 6 received by said machine 4 and proximate said container. In this way an image of the code 74 can be captured by the image capturing device 54 as if it were attached to the container 6. Examples of suitable attachment members comprise: extensions attached to said carrier comprising an adhesive strip (as illustrated); a mechanical fastener such as a clip, bolt or bracket.

Figure 11:
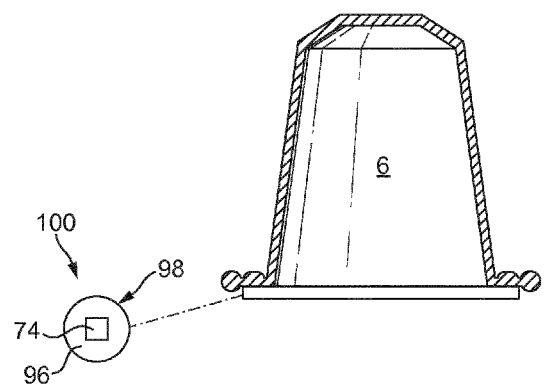

An alternate attachment 100 may comprise the afore-described code 74, arranged on a surface thereof, the attachment 100 configured for attachment to the afore-described container 6. The attachment 100, an example which is illustrated in FIG. 11, comprises: a carrier 96 for carrying the code 74; an attachment member 98 for attachment of the carrier 96 to the container 6. In this way an image of the code 74 can be captured by the image capturing device 54 as if it were formed integrally one the container 6 Examples of suitable attachment members comprise: an adhesive strip (as illustrated); a mechanical fastener such as a clip, bolt or bracket.

LIST OF REFERENCES

2 Preparation system
4 Preparation machine
  10 Housing
    20 Base
    22 Body
  14 Preparation unit
    12 Fluid supply
      24 Reservoir
      26 Fluid pump
      28 fluid thermal exchanger
    Embodiment 1
    30 Agitator unit
    32 Auxiliary product unit
    34 Thermal exchanger
    52 Receptacle support
  16 Control system
    36 User interface
    38 Processor
      46 Memory unit
        48 Preparation program
    40 Sensors (temperature, receptacle level, flow rate, torque, velocity)
    42 Power supply
    44 Communication interface
  18 Code processing system
    54 Image capturing device
    56 Image processing device
    72 Output device
6 Container
  Capsule/Receptacle
  58 Body portion
  60 Lid portion
  62 Flange portion
  Packet
  64 Sheet material
  66 Internal volume
  68 Inlet
  70 Outlet
    74 Code
      76 Unit
        78 Data portion
          90 Encoding area
          82 Data unit
        80 Reference portion
          84 Reference position
          86 Reference unit
          88 Orientation identifier

The invention claimed is:

1. A method of encoding preparation information, the method comprising:
forming a plurality of separate codes on:
a container for a beverage or foodstuff preparation machine, the container for containing beverage or foodstuff material; or
an attachment for attachment to said container or a beverage of foodstuff preparation machine; and
whereby each code at least partially encodes a distinct phase of a preparation process.

2. The method of claim 1, wherein the codes have a peripheral length of 800 - 1500 µm.

3. The method of claim 1, wherein one or more of the codes have a rectangular shape at a periphery thereof, and are arranged adjacent to each other along at least one edge thereof.

4. The method of claim 3, wherein adjacent codes are rotated by one of 90°, 180°, and 270°.

5. The method of claim 1, wherein the codes are arranged as a plurality of columns, the columns being adjacent each other and extending along parallel tracks, whereby adjacent columns are offset with respect to each other in a direction along said tracks.

6. The method of claim 1, wherein the codes are arranged in a sequence that is ordered according to an order of use of the phases encoded therein during a preparation process.

7. The method of claim 6, wherein the codes are arranged into a plurality of coding regions, whereby each coding region comprises:
a plurality of codes encoding the same phase, whereby the regions have said sequential arrangement; or
a plurality of codes encoding the different phases, whereby said plurality of codes in each region have said sequential arrangement.

8. The method of claim 1, wherein one or more of the codes encodes as the preparation information a phase identifier to identify an order of the phase used during said preparation process.

9. The method of claim 1, wherein the code comprises:
a reference portion comprising an arrangement of at least two reference units for defining a reference line r; and
a data portion comprising at least one data unit, wherein said data unit is arranged on an encoding line D that intersects the reference line r, the data unit occupies a distance d along the encoding line D as a variable to at least partially encode a parameter of the preparation information.

10. The method of claim 1, wherein the encoding line D has one of the following arrangements:
the encoding line D is circular and is arranged with a tangent thereto orthogonal to the reference line r at said intersection point; and
the encoding line D is linear and arranged orthogonal to the reference line r.

11. The method of claim 1, wherein the container comprises one of the following: a capsule; a packet; a receptacle for consumption of the beverage or foodstuff therefrom; and a collapsible container.

12. The method of claim 11, wherein the container comprises a packet comprising a plurality of internal volumes, whereby each internal volume has associated therewith a said arrangement of codes.

13. The method of claim 1, further comprising providing a beverage or foodstuff preparation system comprising:
the container; and
a beverage or foodstuff preparation machine, said preparation machine comprising:
a preparation unit to receive the container and to prepare a beverage or foodstuff therefrom;
a code processing system operable to: obtain one or more digital image(s) of a plurality of codes of the container; process said digital image(s) to decode for each phase of a beverage preparation process the encoded preparation information and to determine an order of said phases; and a control system operable to control the preparation unit to execute the preparation process using said decoded preparation information in the determined order of phases.

\* \* \* \* \*